United States Patent
Benson

(10) Patent No.: US 9,927,157 B2
(45) Date of Patent: Mar. 27, 2018

(54) INTEGRATED POWER, COOLING, AND HEATING DEVICE AND METHOD THEREOF

(71) Applicant: Dwayne M. Benson, Chandler, AZ (US)

(72) Inventor: Dwayne M. Benson, Chandler, AZ (US)

(*) Notice: Subject to any disclaimer, the term of this patent is extended or adjusted under 35 U.S.C. 154(b) by 413 days.

(21) Appl. No.: 14/089,107

(22) Filed: Nov. 25, 2013

(65) Prior Publication Data

US 2014/0075970 A1 Mar. 20, 2014

Related U.S. Application Data

(63) Continuation-in-part of application No. 12/802,219, filed on Jun. 2, 2010.

(51) Int. Cl.
| | |
|---|---|
| *F25B 27/02* | (2006.01) |
| *F02C 1/05* | (2006.01) |
| *F25B 30/06* | (2006.01) |
| *F01K 25/10* | (2006.01) |
| *F02C 6/18* | (2006.01) |
| *F25B 29/00* | (2006.01) |

(52) U.S. Cl.
CPC .............. *F25B 27/02* (2013.01); *F01K 25/10* (2013.01); *F02C 1/05* (2013.01); *F02C 6/18* (2013.01); *F25B 30/06* (2013.01); *F05D 2220/64* (2013.01); *F05D 2220/76* (2013.01); *F25B 29/003* (2013.01); *F25B 2400/141* (2013.01)

(58) Field of Classification Search
CPC ........ F02B 37/005; F02B 75/02; F02B 37/02; F02B 41/10; F02G 5/04; F02G 5/02; F01K 23/065; F01K 23/04; F01K 23/02
USPC ...... 62/238.6, 238.4, 238.7; 165/50; 60/653, 60/660, 670, 614, 616, 618, 655
See application file for complete search history.

(56) References Cited

U.S. PATENT DOCUMENTS

| | | | |
|---|---|---|---|
| 1,871,244 A | 8/1932 | Steuart | |
| 2,511,716 A | 6/1950 | Katzow | |
| 2,875,589 A | 3/1959 | Horn | |
| 3,153,442 A | 10/1964 | Silvern | |
| 3,720,842 A * | 3/1973 | Martin | ................. B60H 1/3222 307/68 |
| 4,024,908 A | 5/1977 | Meckler | |

(Continued)

*Primary Examiner* — Jianying Atkisson
*Assistant Examiner* — Meraj A Shaikh
(74) *Attorney, Agent, or Firm* — Robert D. Atkins; Patent Law Group: Atkins and Associates, P.C.

(57) ABSTRACT

A heating, cooling, and power device includes a shaft and an expander coupled to the shaft to rotate the shaft. A first conduit is coupled to the expander and configured to transport a working fluid. A heater is coupled through the first conduit to the expander. A heat pump is coupled to the shaft. An electric machine is coupled to the shaft to produce electricity or mechanical shaft power. A recuperator includes a second conduit coupled between the expander and recuperator. The heat pump includes a first heat exchanger including a second conduit coupled between the expander and the first heat exchanger. An expansion device includes a third conduit coupled between the first heat exchanger and the expansion device. A second heat exchanger includes a fourth conduit coupled between the expansion device and second heat exchanger. A compressor is coupled to the shaft.

19 Claims, 10 Drawing Sheets

(56) References Cited

U.S. PATENT DOCUMENTS

| | | |
|---|---|---|
| 4,118,934 A | 10/1978 | Brola |
| 4,271,679 A | 6/1981 | Schafer |
| 4,531,379 A | 7/1985 | Diefenthaler, Jr. |
| 4,738,111 A | 4/1988 | Edwards |
| 5,228,309 A * | 7/1993 | McCullough ........ A62B 17/005 123/204 |
| 5,448,889 A * | 9/1995 | Bronicki .................. F02C 1/05 60/641.14 |
| 5,685,152 A * | 11/1997 | Sterling ................. B60R 16/03 60/641.15 |
| 5,839,282 A * | 11/1998 | Bronicki ................ F01D 15/10 60/641.2 |
| 6,178,733 B1 * | 1/2001 | Nelson .................... F01D 15/10 290/2 |
| 6,581,384 B1 * | 6/2003 | Benson ................... F01K 25/08 60/653 |
| 6,606,860 B2 | 8/2003 | McFarland |
| 7,523,621 B2 | 4/2009 | Johansson |
| 8,393,171 B2 | 3/2013 | Alston |
| 8,482,152 B1 | 7/2013 | Stahlkopf et al. |
| 2003/0000213 A1 | 1/2003 | Christensen et al. |
| 2003/0228237 A1 * | 12/2003 | Holtzapple ............... F01C 1/10 418/171 |
| 2004/0088993 A1 * | 5/2004 | Radcliff .................. F01K 23/08 60/772 |
| 2006/0218812 A1 | 10/2006 | Brown |
| 2007/0051126 A1 | 3/2007 | Okuda et al. |
| 2007/0280400 A1 * | 12/2007 | Keller ..................... F01K 3/181 376/317 |
| 2008/0006040 A1 | 1/2008 | Peterson et al. |
| 2009/0266093 A1 * | 10/2009 | Aoki ..................... F25B 47/025 62/155 |
| 2009/0266096 A1 * | 10/2009 | Minds ..................... F01K 13/00 62/235.1 |
| 2010/0319346 A1 | 12/2010 | Ast et al. |
| 2011/0000182 A1 | 1/2011 | Lasker |
| 2011/0193346 A1 * | 8/2011 | Guzman ................. F01K 15/02 290/52 |

\* cited by examiner

INTEGRATED POWER, COOLING, AND HEATING DEVICE AND METHOD THEREOF

CLAIM TO DOMESTIC PRIORITY

The present application is a continuation-in-part of U.S. application Ser. No. 12/802,219, filed Jun. 2, 2010, which application is incorporated herein by reference.

FIELD OF THE INVENTION

The present invention relates to a method and device using a heat source to drive an electrical power generator and an air conditioning and heating system to provide power and to heat or cool an environmentally controlled space.

BACKGROUND OF THE INVENTION

Heating, cooling, and ventilation have become ubiquitous around the world. Heating is critical in winter months where temperatures fall well below freezing in many inhabited areas. Similarly, cooling makes hot regions such as the American southwest more livable in terms of temperatures. Around the world, a massive amount of energy is used each year to provide heating and cooling. The energy expended on heating and cooling is costly and leads to a choice between high energy bills or uncomfortable temperatures for consumers.

Inefficiencies in heating and cooling systems drive up energy costs significantly while providing little or no benefit in most cases. For example, many industrial processes produce waste heat as a byproduct. Generally, little or no useful work is accomplished with the waste heat. Thermodynamic cycles, such as absorption cooling, can provide environmental cooling even from low grade heat sources. However, absorption cooling technology suffers from inefficiency.

Energy costs are dependent on many factors, including the type of energy source and time of day. For grid power, the cost of electricity fluctuates heavily from peak hours to off-peak hours. For example, in some instances off-peak electricity can be less expensive than natural gas, while peak electricity is more expensive than the gas. Some energy sources are only available during certain times of day, such as solar energy. Thus, the bottom line efficiency in terms of heating or cooling per dollar spent fluctuates with relevant energy prices applicable to the heating or cooling source.

Motor driven heating and cooling units generally give off a large portion of the energy expended driving the motor as exhaust heat. The lost energy in exhaust heat increases the inefficiency of the heating and cooling unit. Additionally, electrical heating and cooling devices require the conversion of one form of energy into electricity and then back to thermal energy for heating and cooling. The inefficiency of converting energy reduces the efficiency of the electrical heating and cooling devices as a whole.

Heat sources are not always consistent in terms of temperature and availability. The temperatures of various heat sources expelled from industrial processes can fluctuate between hot and cold. When capturing heat from low grade heat sources, inconsistent temperatures can present obstacles to using the heat effectively. The availability of the waste heat may also be intermittent as the underlying process generating the heat produces either less heat or no heat at all. Similarly, solar energy is only generated during daylight hours. A heating and cooling system attempting to use heat as an energy source cannot stop and start intermittently as the availability and temperature of the heat fluctuates.

SUMMARY OF THE INVENTION

A need exists for an efficient and flexible heating and cooling device. Accordingly, in one embodiment, the present invention is a heating, cooling, and power device comprising a shaft and an expander coupled to the shaft to rotate the shaft. A first conduit is coupled to the expander and configured to transport a working fluid. A heater is coupled through the first conduit to the expander. A heat pump is coupled to the shaft. An electric machine is coupled to the shaft to produce electricity or mechanical shaft power.

In another embodiment, the present invention is a heating, cooling, and power device comprising an expander and a shaft coupled to the expander. A first conduit is coupled to the expander and configured to transport a working fluid. A heater is coupled through the first conduit to the expander. A heat pump is coupled to the shaft. An electrical machine is coupled to the shaft.

In another embodiment, the present invention is a heating, cooling, and power device comprising an expander and a shaft coupled to the expander. A heat pump is coupled to the shaft. An electrical machine is coupled to the shaft.

In another embodiment, the present invention is a method of making a heating, cooling, and power device comprising the steps of providing an expander configured for coupling to a shaft, providing an electrical machine configured for coupling to the shaft, and providing a heat pump configured for coupling through the shaft to the expander.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. The flexible system runs on thermal power, gas power, or electrical power depending on availability and cost of different energy sources.

For example, if low-cost solar heat is available, the system can run on solar thermal power. If solar thermal power is available, but no energy is required to heat or cool a space, then the system sends electricity back to the electrical grid. If natural gas is a cheaper energy source than electricity, then the system can run on natural gas when solar thermal power is unavailable. During off-peak hours, if electricity is a lower cost energy source than gas, then the system can switch to electricity. The flexibility to operate on different power sources and return energy to the electrical grid in times of surplus enables the heating, cooling, and power device to operate with maximized economic efficiency.

Figure 1:
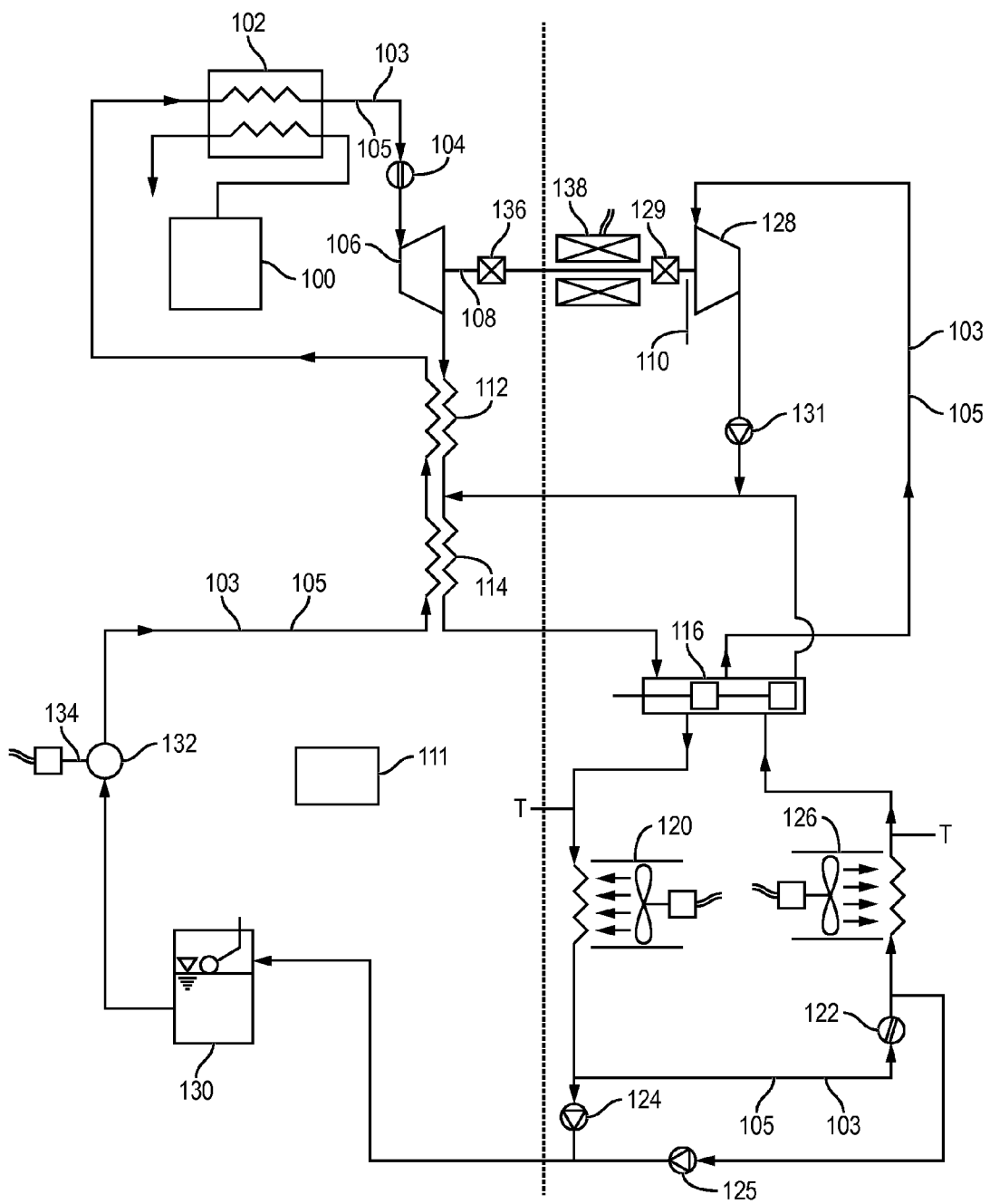
FIG. 1 illustrates a schematic diagram of a heating, cooling, and power device configured for cooling a conditioned space and including an electrical machine.

FIG. 1 illustrates a schematic diagram of a heating, cooling, and power device including an electrical machine. The device is configured in cooling mode. Heat source 100 provides heat to heater 102. Heat source 100 and heater 102 could be any appropriate source or medium of heat of sufficient temperature and quantity to allow proper operation of the system, e.g., an exhaust from a combustion engine, a solar panel, a furnace, waste heat, or other heat sources.

Heater 102 is coupled through conduit 103 to overspeed control valve 104. Conduit 103 is tubing, pipe, or other medium configured to transport working fluid 105 through components of the heating, cooling, and power device. In heater 102, the thermal energy from heat source 100 is transferred into working fluid 105 to increase the temperature of the working fluid. The heated working fluid exits heater 102 and passes through expander startup and overspeed control valve 104, which can limit the flow of working fluid 105 from heater 102 to expander 106. Expander 106 is a device that converts the thermal energy of the working fluid into kinetic energy, e.g., a turbine, scroll expander, piston motor, or other expander. The working fluid expands through expander 106 converting some of the thermal energy in working fluid 105 into mechanical energy to drive shaft 108, which is coupled to the expander. Speed sensor 110 detects the speed at which shaft 108 or expander 106 are rotating and sends the information to controller 111 to apply speed control logic. Controller 111 can increase or decrease the rotational speed of expander 106 by adjusting solenoid actuated control valve 104.

Working fluid 105 exits expander 106 and enters recuperator 112 and 114. Working fluid 105 entering recuperators 112 and 114 from expander 106 is at a higher temperature than working fluid 105 moving through recuperators 112 and 114 to enter heater 102. Heat from working fluid 105 exiting expander 106 is used to preheat working fluid that will enter heater 102. Recuperators 112 and 114 increase efficiency by recapturing heat that might otherwise be lost as working fluid 105 exits expander 106. Working fluid 105 from expander 106 moves through recuperators 112 and 114 and enters valve 116, which is set to switch the heating and cooling system into cooling mode. Working fluid 105 flows through valve 116 into heat exchanger or condenser 120.

Condenser 120 cools working fluid 105. While in the condenser, heat from working fluid 105 is transferred into a condenser coolant, e.g., air, water, or other fluid that is cooler than the working fluid. The condensed working fluid flows out of condenser 120 as a liquid and through either bidirectional variable area expansion valve 122 or check valve 124. Working fluid 105 that passes through expansion valve 122 exits the valve as a low-pressure liquid and enters evaporator or heat exchanger 126. Working fluid 105 in evaporator 126 evaporates from a liquid to a gas, absorbing heat from a fluid passing over evaporator coils in the process. A fan blows over the evaporator to cool an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or an electrical generator. Working fluid 105 exits the evaporator and flows back through valve 116 into compressor 128.

Compressor 128 is coupled to shaft 108. Shaft 108 drives compressor 128 to compress the gaseous working fluid exiting from evaporator 126 and increases the pressure and temperature of the working fluid. The speed of compressor 128 is monitored by sensor 110 so that the angular velocity of shaft 108 can be adjusted to the desired rate. Pressurized working fluid 105 exiting compressor 128 passes through check valve 131 and mixes with working fluid 105 exiting expander 106, which also passes through recuperator 114.

Clutch 129 allows the compressor to disengage from shaft 108 when the heat pump function is unnecessary. Working fluid 105 that passes through check valve 124 returns to reservoir or feed tank 130. Reservoir 130 includes a fluid level sensor to detect the amount of working fluid 105 available in reservoir 130. A conduit extends between variable speed pump 132 and reservoir 130 so that pump 132 can pressurize the working fluid to a high pressure liquid. Speed sensor 134 monitors pump 132 and transmits data to the controller to adjust the output pressure of the working fluid leaving pump 132 as needed. Pressurized working fluid 105 exits pump 132 and flows through recuperators 114 and 112 for preheating before entering heater 102. The working fluid then exits recuperators 112 and 114 and enters heater 102.

Clutch 136 is coupled to shaft 108 between expander 106 and electric machine 138 to disengage the expander from the shaft when heat is not available or the expander function is not needed. Electrical machine 138 is coupled to shaft 108. Electrical machine 138 can be configured as a generator to convert the kinetic energy in shaft 108 to electricity. Electrical machine 138 can also be configured as a motor to drive shaft 108 and compressor 128 when the heat from heat source 100 is insufficient to drive expander 106 at a sufficient rate. Clutch 136 can be an externally actuated or passive clutch. A passive, overrunning clutch 136 can be used when electrical machine 138 is configured as a motor to allow electrical machine 138 to drive compressor 128 independent of expander 106.

When valve 116 is shifted to the right, heat is added to the environmentally controlled space at heat exchanger 126, now operating as a condenser coil. Liquid refrigerant leaving heat exchanger 126 passes through expansion valve 122 and becomes a low-pressure, two-phase fluid. Working fluid 105 enters heat exchanger 120 where the liquid refrigerant is evaporated by absorbing heat from the second fluid passing through heat exchanger 120, e.g., ambient air. Working fluid 105 passes through valve 116 to compressor 128, where the working fluid is compressed from a low-pressure gas to a medium-pressure gas. Working fluid 105 leaves compressor 128, passes through check valve 131, and mixes with working fluid 105 leaving recuperator 112. The working fluid then enters valve 116 to flow to heat exchanger 126. Still referring to heating mode, working fluid 105 leaving heat exchanger 126 may also pass through check valve 125 and then flow to refrigerant reservoir 130 to operate the power cycle, as previously described.

A second heating mode may be configured when valve 116 is shifted to the left and clutch 129 is disengaged to decouple compressor 128 from shaft 108. Without compressor 128 operating, all working fluid 105 flows from recuperator 112 through valve 116 and through heat exchanger 128, which is operating as a condenser. All working fluid 105 leaving heat exchanger 126, now liquid refrigerant, passes through check valve 125, and flows to refrigerant reservoir 130. No working fluid 105 flows through heat exchanger 120, and no working fluid 105 passes through compressor 128. Check valve 131 prevents backflow through compressor 128. Compressor 128 may include an outlet check valve for normal operation, eliminating the need to add a separate check valve to the system.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. The flexible system runs on thermal power or electrical power depending on availability and cost of different energy sources.

Figure 2:
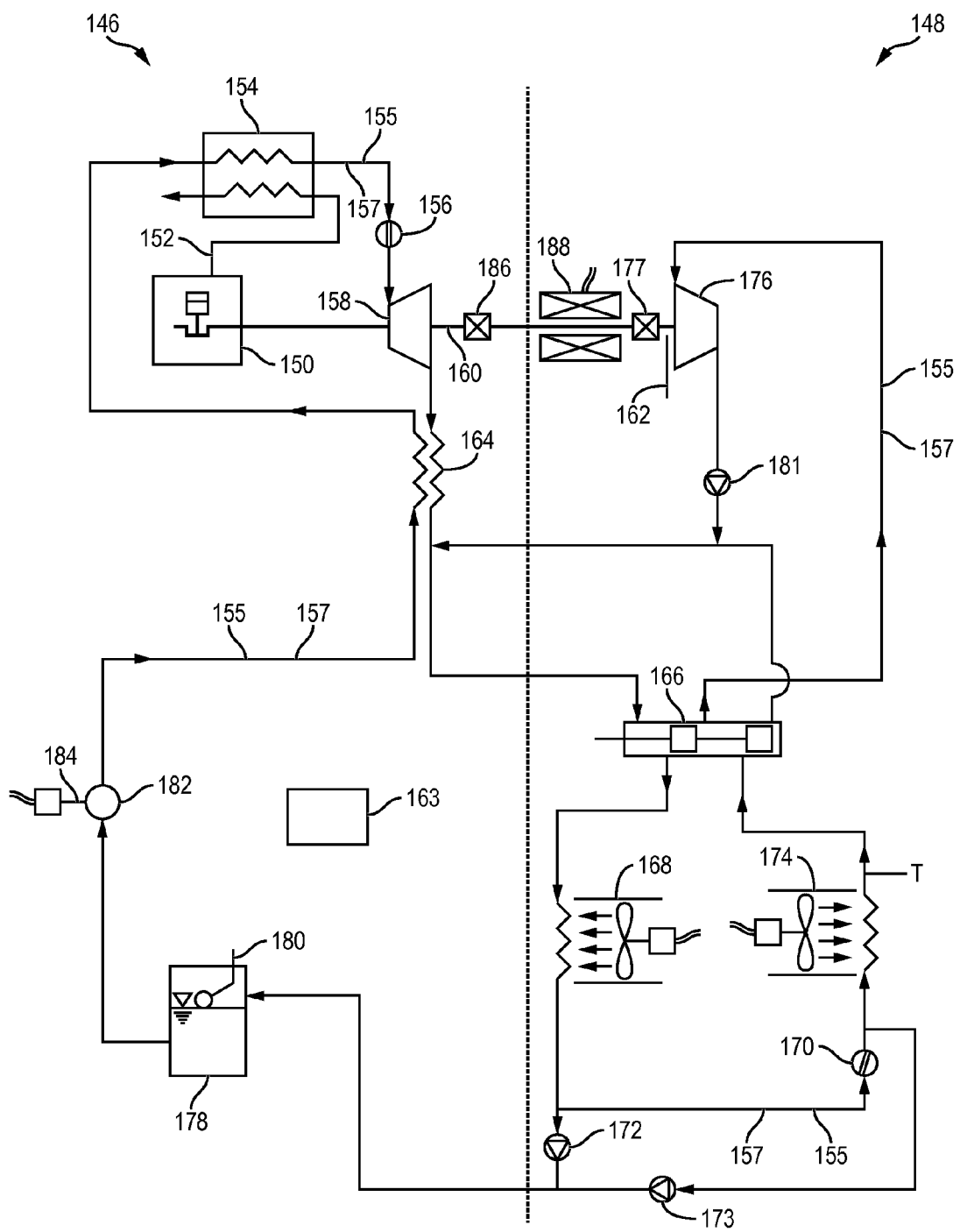
FIG. 2 illustrates a schematic diagram of a heating, cooling, and power device including a prime mover and configured for cooling a conditioned space.

FIG. 2 illustrates a schematic diagram of a heating, cooling, and power device including a prime mover and configured for cooling a conditioned space. The device is configured in cooling mode. The device includes a power cycle 146 and a heat pump cycle 148 driven using a common working fluid. A prime mover or engine 150 is configured with an exhaust 152 from the prime mover providing heat to heater 154. Heater 154 is coupled through conduit 155 to overspeed control valve 156. Conduit 155 can be tubing, pipe, or another medium configured to transport working fluid 157 through components of the heating, cooling, and power device. Exhaust 152 or heater 154 could be augmented by any appropriate source of heat of sufficient temperature and quantity to allow proper operation of the system, e.g., an exhaust from a combustion engine, a solar panel, a furnace, or another suitable heat source.

Working fluid 157 flows through heater 154 where the thermal energy from exhaust 152 is transferred into the working fluid to increase the temperature of the working fluid. The heated working fluid exits heater 154 as a high pressure superheated refrigerant and passes through expander startup and overspeed control valve 156, which limits the flow of working fluid 157 from heater 154 to expander 158. Expander 158 is a device that converts some of the thermal energy of the working fluid into kinetic energy to rotate shaft 160, e.g., a turbine, scroll expander, piston motor, or other expander. Working fluid 157 expands through expander 158 to drive shaft 160 coupled to the expander and exits the expander as a high-pressure, two-phase refrigerant. Speed sensor 162 detects rotational speed of shaft 160 or expander 158 and sends the information to controller 163 to use the speed control logic.

Working fluid 157 exits expander 158 and enters recuperator 164. Working fluid entering recuperator 164 from expander 158 is at a higher temperature than working fluid moving through recuperator 164 to enter heater 154 so that the temperature of working fluid 157 exiting the recuperator towards the heater is increased in the recuperator. Heat from working fluid 157 exiting expander 158 is used to preheat working fluid 157 entering heater 154. Recuperator 164 increases efficiency by recapturing heat that would otherwise be lost as working fluid 157 exits expander 158. Working fluid 157 from expander 158 moves through recuperator 164 and enters valve 166, which is set to switch the heating and cooling system or heat pump into cooling mode in FIG. 2. Valve 166 can be a three-way valve, a five-way valve, a pair of three-way valves, or another suitable valve or combination of valves for switching between operation modes. Working fluid 157 flows through valve 166 into heat exchanger or condenser 168.

Condenser 168 cools working fluid 157. While in the condenser, heat from working fluid 157 is transferred into a condenser coolant, e.g., air, water, or other fluid that is cooler than the working fluid. In one embodiment, a fan blows over the condenser to cool an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or an electrical generator.

The condensed working fluid 157 flows out of condenser 168 as a liquid and through either bidirectional variable area expansion valve 170 or check valve 172. Working fluid 157 that passes through expansion valve 170 exits the valve as a low-pressure liquid and enters evaporator or heat exchanger 174. The working fluid in evaporator 174 evaporates from a liquid to a gas, absorbing heat from a fluid passing over the evaporator coils in the process. A fan blows air over the evaporator to cool an environmentally controlled space, e.g., a vehicle, tent, or structure. Working fluid 157 exits the expander and flows back through valve 166 and into compressor 176.

Compressor 176 is coupled to shaft 160. Shaft 160 drives compressor 176 to compress gaseous working fluid 157 from evaporator 126 and increases the pressure of the working fluid. The speed of compressor 128 is controlled by the angular velocity of shaft 160 so that the speed of the shaft can be adjusted to drive the compressor at the desired rate. Clutch 177 allows the compressor to disengage from shaft 108 when the heat pump function is unnecessary. Pressurized working fluid 157 exiting compressor 176 mixes with the working fluid 157 exiting expander 158 and passes through recuperator 164.

Working fluid 157 that passes through check valve 172 returns to reservoir or feed tank 178. Reservoir 178 includes a fluid level sensor 180 to detect the amount of working fluid 157 available in reservoir 178. A conduit extends between variable speed pump 182 and reservoir 178 so that pump 182 can pressurize working fluid 157 to a high pressure liquid. Speed sensor 184 monitors pump 182 and transmits data to the controller to adjust the pressure of the working fluid exiting pump 182 as needed. Pressurized working fluid exits pump 182 and flows through recuperator 164 for preheating. Working fluid 157 then exits recuperator 164 after preheating and enters heater 154.

Clutch 186 is coupled to shaft 160 between expander and compressor to disengage the compressor from the expander. Electrical machine 188 is coupled to shaft 160. Clutch 186 can be coupled in different locations on shaft 160 to disengage any component coupled to the shaft and enable different modes of operation. Clutch 186 can be an externally actuated or passive clutch. Electrical machine 188 converts the kinetic energy in shaft 160 to electricity. Electrical machine 188 also acts as a motor to drive shaft 160 and compressor 176 when the heat from exhaust 152 is insufficient to drive expander 158 at a sufficient rate. A passive, overrunning clutch can be used when electrical machine 188 is configured as a motor to allow electrical machine 188 to drive compressor 176 independent of expander 158.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. A prime mover is coupled to the shaft to enhance cost efficiency and enable the system to run on fuel power, thermal power, or electrical power depending on availability and cost of different energy sources. By using the exhaust from the prime mover as a heat source, some of the thermal energy normally expelled in hot exhaust is recovered and used to produce mechanical or electrical power.

Figure 3A:
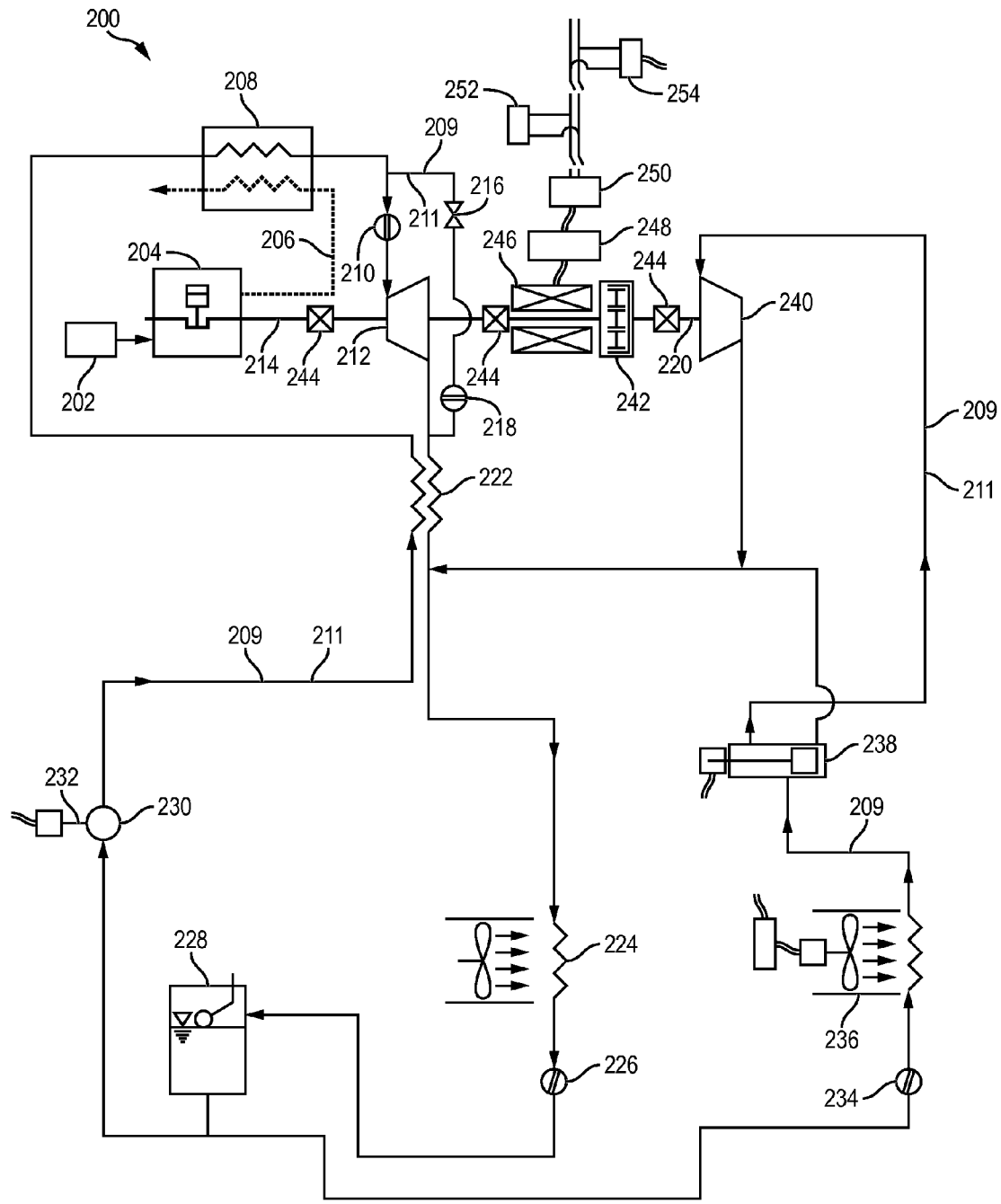
FIGS. 3*a*-3*b* illustrate a schematic diagram of a heating, cooling, and power device configured for cooling or heating a conditioned space and including a prime mover.
Figure 3B:
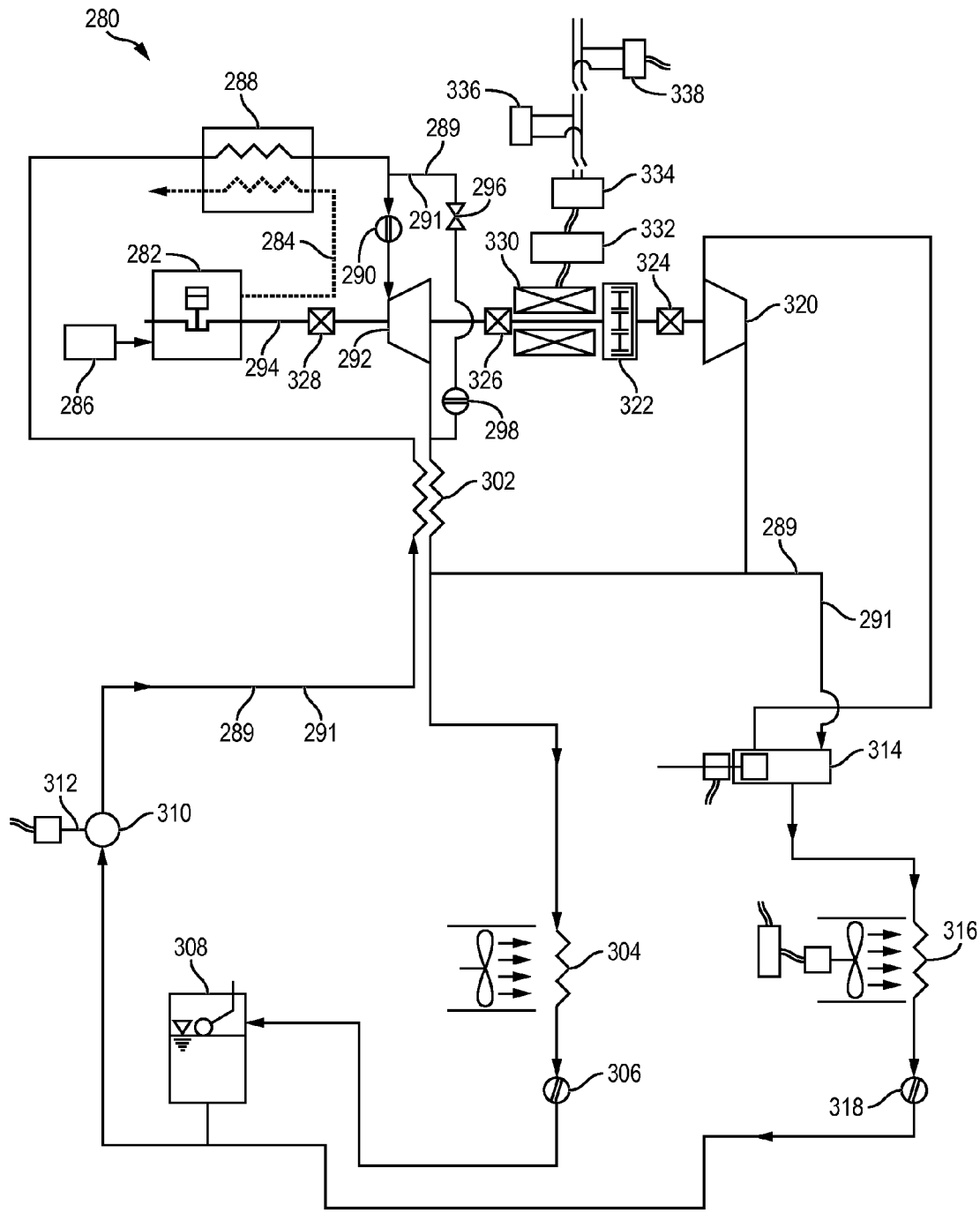

FIGS. 3a-3b illustrate a schematic diagram of a heating, cooling, and power device including a prime mover and configured for cooling or heating a conditioned space. In FIG. 3a, device 200 is configured in cooling mode. Fuel source 202 such as a natural gas line or fuel tank provides fuel to a prime mover or engine 204. Prime mover 204 is configured with an exhaust 206 from the prime mover providing heat to heater 208. Exhaust 206 or heater 208 could be augmented by any appropriate source of heat of sufficient temperature and quantity to allow proper operation of the system, e.g., an exhaust from a combustion engine, a solar panel, a furnace, or another suitable heat source. Heater 208 is coupled through conduit 209 to overspeed control valve 210. Conduit 209 can be tubing, pipe, or another medium configured to transport working fluid 211 through components of the heating, cooling, and power device.

Working fluid 211 flows through heater 208 where the thermal energy from exhaust 206 is transferred into the working fluid to increase the temperature of the working fluid. Heated working fluid 211 exits heater 208 as a high pressure superheated refrigerant and passes through expander startup and overspeed control valve 210, which limits the flow of the working fluid from heater 208 to expander 212. Expander 212 is a device that converts some of the thermal energy of working fluid 157 into kinetic energy to rotate shaft 214, e.g., a turbine, scroll expander, piston motor, or other expander. Working fluid 157 expands through expander 212 to drive shaft 214, which is coupled to the expander, and exits the expander as a high-pressure, two-phase refrigerant. A portion of the working fluid also diverts through a conduit to orifice 216 and bleed valve 218 before rejoining working fluid 157 exiting expander 212. Speed sensor 220 detects rotational speed at which shaft 214 or expander 212 are rotating and sends the information to the controller to use the speed control logic.

Working fluid 211 exits expander 212 or bleed valve 218, mixes together, and flows into recuperator 222. Working fluid 211 entering recuperator 222 from expander 212 or bleed valve 218 is at a higher temperature than working fluid 211 exiting recuperator 222 to enter heater 208. Heat is transferred from working fluid 211 entering recuperator 222 from the expander 212 or bleed valve 218 to the working fluid that will exit recuperator 222 and enter heater 208, so that the temperature of working fluid 211 exiting the recuperator towards heater 208 is increased in the recuperator. Heat from working fluid 211 exiting expander 212 is used to preheat working fluid 211 entering heater 208. Recuperator 222 increases efficiency by recapturing heat that would otherwise be lost as working fluid 211 exits expander 212. Working fluid 211 from expander 212 or bleed valve 218 moves through recuperator 222 and enters condenser 224. Condenser 224 cools working fluid 211. While in the condenser, heat from working fluid 211 is transferred into a condenser coolant, e.g., air, water, or other fluid that is cooler than the working fluid. In one embodiment, a fan blows over the condenser to heat an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or an electrical generator.

Condensed working fluid 211 flows out of condenser 224 as a liquid and through bidirectional valve 226. Working fluid 211 that passes through valve 226 enters reservoir or tank 228. Reservoir 228 includes a fluid level sensor to detect the amount of working fluid 211 available in reservoir 228. A conduit extends between variable speed pump 230 and reservoir 228 so that pump 230 can pressurize the working fluid to a high pressure liquid. A speed sensor 232 monitors pump 230 and transmits data to the controller to adjust the pressure of pump 230 as needed. Pressurized working fluid 211 exits pump 230 and flows through recuperator 222 for preheating. The working fluid then exits recuperator 222 after preheating and enters heater 208.

Some of working fluid 211 from tank 228 flows through bi-directional area expansion valve 234, converting the working fluid from a liquid to a vapor. Working fluid 211 then flows into heat exchanger or evaporator 236 and evaporates the remaining working fluid, with the working fluid absorbing heat from an evaporator fluid that is warmer than the working fluid, e.g., air or water. A fan blows over the evaporator to cool an environmentally controlled space, e.g., a vehicle, tent, or structure. Working fluid 211 exits expander 212 and flows through valve 238 into compressor 240.

Compressor 240 is coupled to shaft 214. Shaft 214 drives compressor 240 to compress gaseous working fluid 211 from evaporator 236 and increases the pressure of the working fluid. The speed of compressor 240 is controlled by the angular velocity of shaft 214 with compressor 240 coupled through gearbox 242 to shaft 214. Gearbox 242 allows rotating components such as the expander, compressor, and electric machine to rotate at different speeds. The speed of shaft 214 can be adjusted to drive compressor 240 at the desired rate by controlling the amount of power generated by the expander, prime mover, and electrical machine. Pressurized working fluid 211 exiting compressor 240 mixes with the working fluid exiting recuperator 222 from expander 212 and mixes together before flowing to condenser 224.

Clutch 244 is coupled to shaft 214 between expander and compressor to disengage the compressor from the expander. Electrical machine 246 is coupled to shaft 214. Clutch 244 can be coupled in different locations on shaft 214 to disengage any component coupled to the shaft and enable different modes of operation. Clutch 244 can be an externally actuated or passive clutch. Electrical machine 246 converts the kinetic energy in shaft 214 to electricity. Electrical machine 246 also acts as a motor to drive shaft 214 and compressor 240 when the heat from exhaust 206 is insufficient to drive expander 212 at a sufficient rate. A passive, overrunning clutch can be used when electrical machine 246 is configured as a motor to allow electrical machine 246 to drive compressor 240 independent of expander 212.

An electrical system is electrically connected to electrical machine 246. The electrical system includes a power converter 248 and power quality filter 250 to convert power produced by the generator to power suitable for storage in battery 252 or use in another application. Similarly, power converter 248 can be used to convert power from battery 252 to the proper form to drive electrical machine 246. Electrical machine 246 can be an AC or DC electrical machine with the required voltage or type conversions carried out in converter 248. An optional DC to AC power inverter can convert DC power from battery 252 or power from electrical machine 246 to 120 volt AC power.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. A prime mover is coupled to the shaft to enhance cost efficiency and enable the system to run on fuel power, thermal power, or electrical power depending on availability and cost of different energy sources. By using the exhaust from the prime mover as a heat source, some of the thermal energy normally expelled in hot exhaust is recovered and used to produce mechanical or electrical power.

FIG. 3b illustrates a schematic diagram of heating and cooling device 280, as shown as device 200 in FIG. 3a, configured in a heating mode. A prime mover or engine 282 is configured with an exhaust 284 and fuel source 286. The exhaust 284 from prime mover 282 is transferred to heater 288 to provide a heat source for the heater. Exhaust 284 or heater 288 could be augmented by any appropriate source of heat of sufficient temperature and quantity to allow proper operation of the system, e.g., an exhaust from a combustion engine, a solar panel, a furnace, or another suitable heat source. Heater 288 is coupled through conduit 289 to overspeed control valve 290. Conduit 209 can be tubing, pipe, or another medium configured to transport working fluid 291 through components of the heating, cooling, and power device.

Working fluid 291 flows through heater 288 where the thermal energy from exhaust 284 is transferred into a working fluid to increase the temperature of the working fluid. Heated working fluid 291 exits heater 288 as a high pressure superheated refrigerant and passes through expander startup and overspeed control valve 290, which limits the flow of working fluid 291 from heater 288 to expander 292. Expander 292 is a device that converts some of the thermal energy of working fluid 291 into kinetic energy to rotate shaft 294, e.g., a turbine, scroll expander, piston motor, or other expander. Working fluid 291 expands through expander 292 to drive shaft 294, which is coupled to the expander. Working fluid 291 exits expander 292 as a high-pressure, two-phase refrigerant. A speed sensor detects rotational speed at which shaft 294 or expander 292 are rotating and sends the information to the controller to use the speed control logic to throttle the device as necessary to achieve the desired output level. A portion of working fluid 291 also diverts through a parallel conduit to orifice 296 and bleed valve 298 before rejoining working fluid exiting expander 292.

Working fluid 291 exits expander 292 or bleed valve 298, mixes together, and flows into recuperator 302. Working fluid entering recuperator 302 from expander 292 or bleed valve 298 is at a higher temperature than working fluid moving through recuperator 302 for preheating prior to entering heater 288. Heat is transferred to working fluid 291 that will exit recuperator 302 and enter heater 288 from working fluid 291 exiting expander 292 or bleed valve 298 and entering recuperator 302, so that the temperature of working fluid exiting the recuperator towards heater 288 is increased in the recuperator. Heat from working fluid exiting expander 292 is used to preheat working fluid entering heater 288. Recuperator 302 increases efficiency by recapturing heat that would otherwise be lost as working fluid exits expander 292. Working fluid from expander 292 or bleed valve 298 moves through recuperator 302 and enters condenser 304.

Condenser 304 cools working fluid. While in the condenser, heat from working fluid 291 is transferred into a condenser coolant, e.g., air, water, or other fluid that is cooler than working fluid 291. In one embodiment, a fan blows over the condenser to heat an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or an electrical generator.

The condensed working fluid flows out of condenser 304 as a liquid, through bidirectional valve 306, and into reservoir or feed tank 308. Reservoir 308 includes a fluid level sensor to detect the amount of working fluid available in reservoir 308. A conduit extends between variable speed pump 310 and reservoir 308 to transport working fluid 291 so that pump 310 can pressurize working fluid 291 into a high pressure liquid. Speed sensor 312 monitors pump 310 and sends data to the controller to adjust the pressure of working fluid exiting pump 310. Pressurized working fluid 291 exits pump 310 and flows through recuperator 302 for preheating. Working fluid 291 then exits recuperator 302 after preheating and enters heater 288.

The remainder of working fluid exiting recuperator 302 also flows through solenoid actuated valve 314, which is switched to change the device between a heating mode and a cooling mode. Working fluid 291 then flows into heat exchanger 316 which is operating as a condenser in heating mode. Heat exchanger 316 cools working fluid 291. While in the condenser, heat from working fluid 291 is transferred into a condenser coolant, e.g., air, water, or other fluid that is cooler than working fluid 291. In one embodiment, a fan blows over the condenser to heat an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or an electrical generator. Working fluid 291 exits heat exchanger 316 and flows through valve 318 into reservoir 308. Compressor 320 is coupled to shaft 294 through gearbox 322, however the compressor is not required to operate the heating, cooling, and power device of FIGS. 3a-3b in a heating mode. Gearbox 322 allows rotating components such as expander 292, compressor 320, and prime mover 282 to rotate at different speeds.

Clutches 324 and 326 are coupled to shaft 294 between expander 292 and compressor 320 to disengage the compressor from the expander. Clutches can also be included in gearbox 322 to disengage rotating components for different modes of operation. Electrical machine 330 is coupled to shaft 294. Clutch 326 can be coupled in different locations on shaft 294 to disengage any component coupled to the shaft and enable different modes of operation. Clutch 326 can be an externally actuated or passive clutch.

An electrical machine 330 is coupled to shaft 294 to provide mechanical energy or convert mechanical energy to electricity. Electrical machine 330 converts the kinetic energy in shaft 294 to electricity when configured in a generator mode. Electrical machine 330 can also be configured as a motor to drive shaft 294 and compressor 314 when the heat from exhaust 284 is insufficient to drive expander 292 at a sufficient rate. A passive, overrunning clutch can be used when electrical machine 330 is configured as a motor to allow electrical machine 330 to drive compressor 314 independent of expander 292.

An electrical system is electrically connected to electrical machine 246. The electrical system includes a power converter 332 and power quality filter 334 to convert power produced by the generator to power suitable for storage in battery 336 or use in another application. Similarly, power converter 332 can be used to convert power from battery 336 to the proper form to drive electrical machine 330. Electrical machine 330 can be an AC or DC electrical machine with the required voltage or type conversions carried out in converter 332. An optional DC to AC power inverter 338 can convert DC power from battery 336 or power from electrical machine 330 to 120 volt AC power to drive standard household products. Electricity from electric machine 330 or battery 336 is used to power fans, pumps, and sensors used throughout the device.

The heating, cooling, and power device maximizes efficiency by using a common working fluid for the power cycle and heat pump cycle. A common working fluid flows through the heater, expander, and heat pump to provide power to a shaft while heating or cooling a space. The system operating with a common working fluid operates without requiring an energy conversion from heat to electricity in order to operate, saving the energy cost normally lost in conversion. An electrical machine is coupled to the shaft to augment power provided by the expander or to convert excess power provided by the expander into electricity to store or send to the power grid. A prime mover is coupled to the shaft to enhance cost efficiency and enable the system to operate on fuel power, thermal power, or electrical power depending on availability and cost of different energy sources.

Figure 4A:
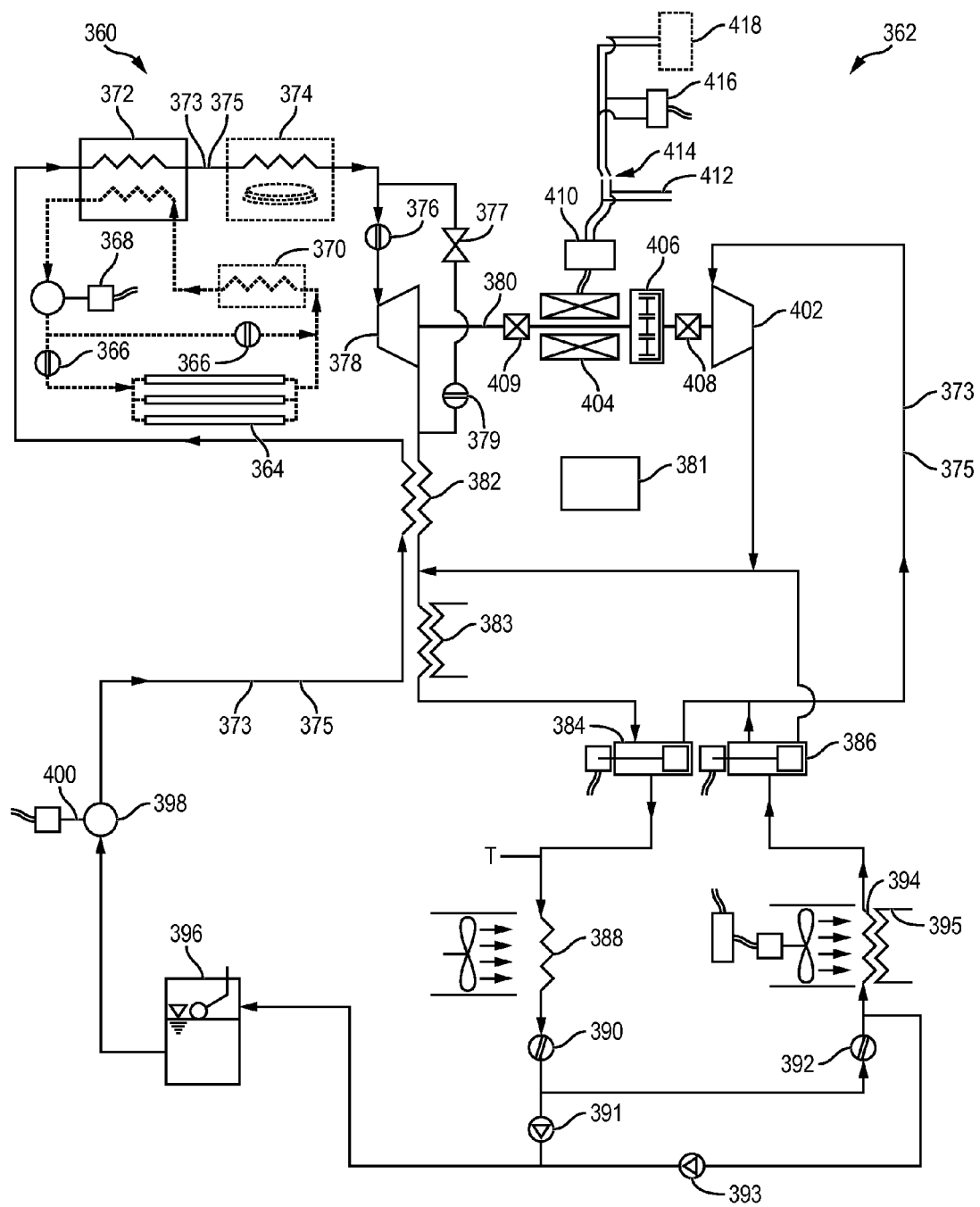
FIGS. 4*a*-4*c* illustrate a schematic diagram of a heating, cooling, and power device including solar and gas heat sources and configured for cooling or heating a conditioned space.
Figure 4B:
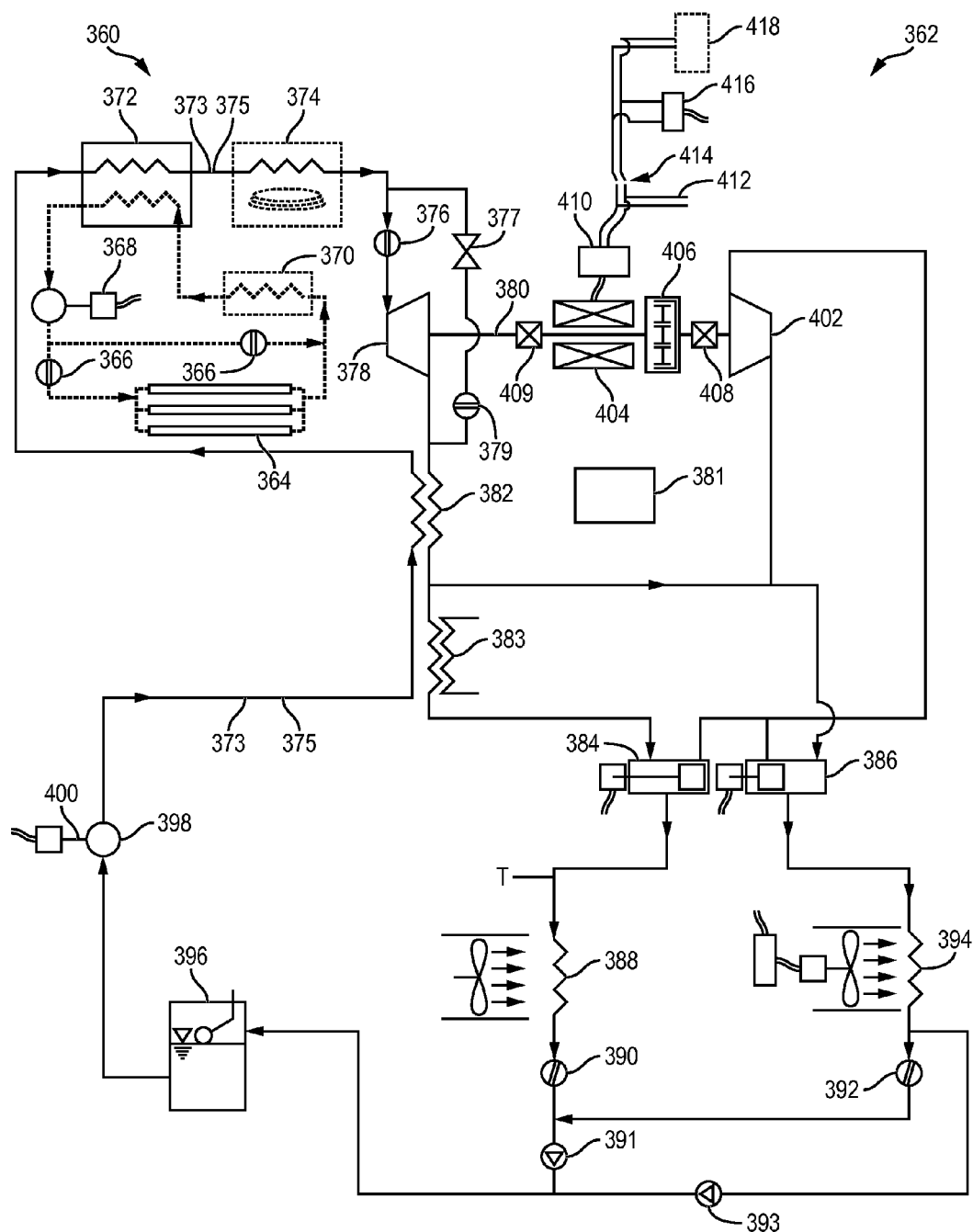
Figure 4C:
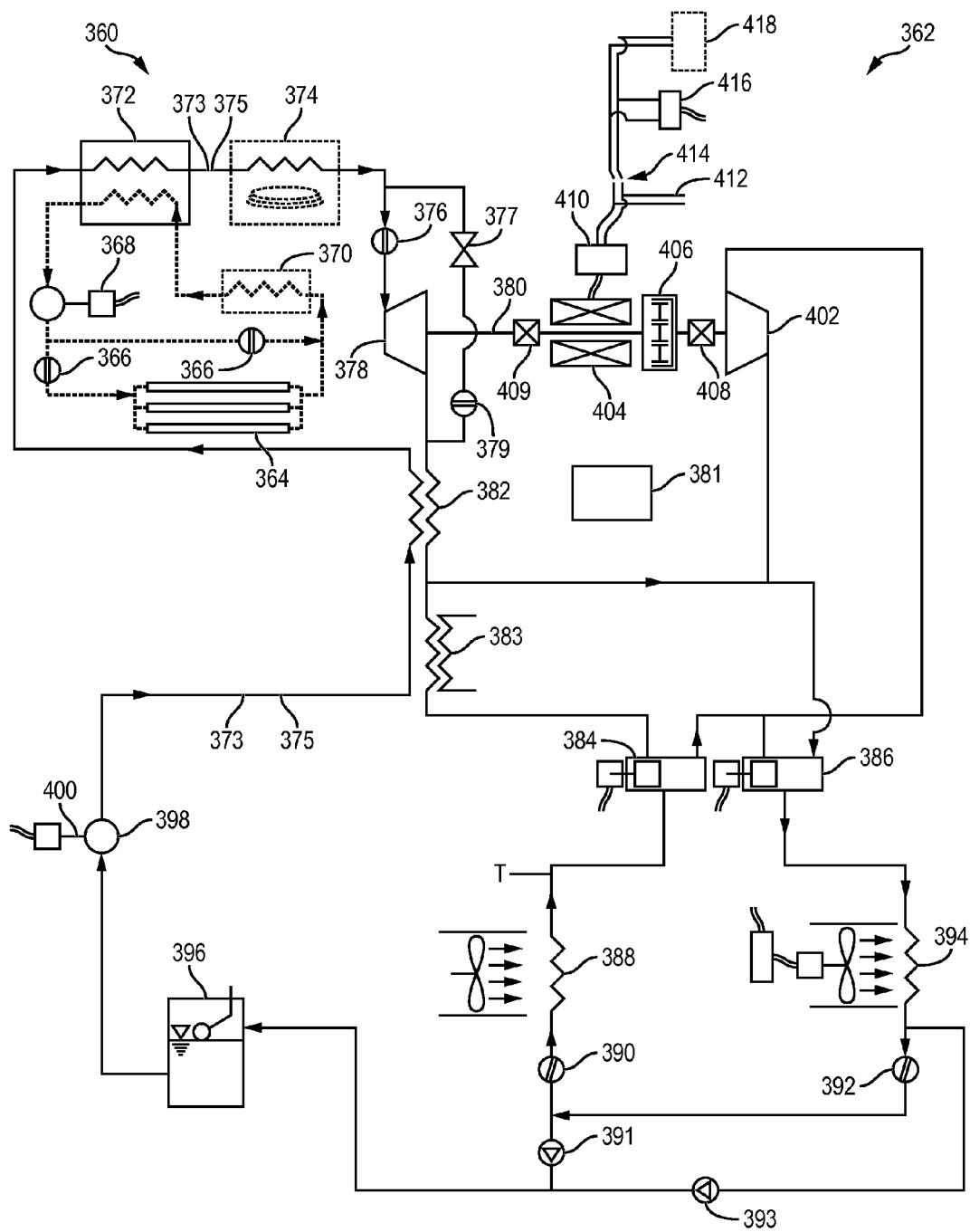

FIGS. 4a-4c illustrate a schematic diagram of a heating, cooling, and power device including solar and gas heat sources and configured for cooling or heating a conditioned space. In FIG. 4a, the device is configured in a cooling mode. The device includes power cycle 360 and heat pump cycle 362. Solar collector 364 includes thermal solar panels to convert solar energy into thermal energy. The thermal energy is transferred into a heated fluid such as specialized thermal oil for transportation or storage, although other fluids are also effective, e.g., water or any fluid suitable for transporting and storing heat. Valves 366 control the flow of the fluid, which is moved by pump 368 from solar collector 364 to thermal storage 370. Pump 368 can be placed at various points on the thermal heating system.

Thermal storage 370 stores heat for later use by storing heated fluid in an insulated container. The stored liquid is later used as a heat source for heater 372. Heat storage allows for time shifting the operation of the heating, cooling, and power device for operation on solar heat energy. Solar heat energy can be used when solar energy is usually unavailable, i.e., at night. Storage can also preserve excess solar energy for later use. The heated fluid can also flow directly into heater 372 without stopping in thermal storage 370 to provide heat to the heater 372. Heater 372 is coupled through conduit 373 to a supplemental heater, such as gas heater 374. Conduit 373 can be tubing, pipe, or another medium configured to transport working fluid 375 through components of the heating, cooling, and power device.

Heater 372 transfers heat from the solar heat source into a working fluid, i.e., a refrigerant, water, or other suitable liquid, flowing through heater 372 to increase the temperature of working fluid 375. Gas heater 374 is used in addition, or as an alternative, to solar collector 364 as a heat source to heat working fluid 375. The heated working fluid exits heaters 372 or 374 as a high-pressure, superheated refrigerant and passes through expander startup and overspeed control valve 376, which limits the flow of working fluid 375 from heater 372 or 374 to expander 378. Alternatively, working fluid exiting the heaters can flow through orifice 377 and bypass valve 379 to bypass expander 378 during startup, shutdown, or at other times when bypass is desirable.

Expander 378 is a device that converts some of the thermal energy of working fluid 375 into kinetic energy to rotate shaft 380, e.g., a turbine, scroll expander, piston motor, or other expander. Working fluid 375 expands through expander 378 to drive shaft 380, which is coupled to the expander. Working fluid 375 then exits the expander as a medium-pressure refrigerant. The rotational speed at which shaft 380 or expander 378 are rotating is monitored and sent to the controller 381 by sensors, to use the speed control logic to adjust the amount of energy delivered to shaft 380.

Working fluid 375 exits expander 378 and enters recuperator 382. Heat from working fluid 375 exiting expander 378 is used to preheat working fluid 375 entering heater 372. Working fluid 375 entering recuperator 382 from expander 378 has a higher temperature than working fluid 375 exiting recuperator 382 to enter heater 372 or 374, so the temperature of working fluid 375 exiting the recuperator towards the heater is increased in the recuperator. Recuperator 382 increases efficiency by recapturing thermal energy that would otherwise be rejected to the atmosphere by condenser 388. Working fluid 375 from expander 378 moves through recuperator 382 and optional hot water heater 383 and enters three-way valve 384. Valve 384 and valve 386 are configured to switch the heating and cooling system or heat pump into cooling mode in FIG. 4a. Three-way valves 384 and 386 can be replaced with different valve configurations similar to the valves shown in FIGS. 1-3b. Working fluid 375 flows through valve 384 into heat exchanger or condenser 388.

Condenser 388 cools working fluid 375. While in the condenser, heat from working fluid 375 is transferred into a condenser coolant, e.g., air, water, or other fluid that is cooler than working fluid 375. In one embodiment, a fan blows over the condenser to reject heat from working fluid 375 to the atmosphere. The fan can be coupled to the shaft and driven by the mechanical energy delivered to the shaft, or the fan can be powered by an electrical motor with electricity provided by a battery, power grid, or electrical generator 404.

The condensed working fluid flows out of condenser 388 as a liquid and through bidirectional valve 390. Working fluid 375 then either passes through bidirectional variable area expansion valve 392 to heat exchanger 394 or to reservoir 396.

Reservoir 396 includes a fluid level sensor to detect the amount of working fluid 375 available in reservoir 396. A conduit extends between variable speed pump 398 and reservoir 396 so that pump 398 can pressurize working fluid 375 to a high pressure liquid. Speed sensor 400 monitors pump 398 and transmits data to the controller 381 to adjust the pressure of pump 398 as needed. Pressurized working fluid 375 exits pump 398 and flows through recuperator 382 for preheating. Working fluid 375 then exits recuperator 382 after preheating and enters heater 372 or 374.

Working fluid 375 that passes through expansion valve 392 exits the valve as a low-pressure, two-phase fluid and enters evaporator or heat exchanger 394. Working fluid 375 in evaporator 394 evaporates from a liquid phase to a gas phase, absorbing heat in the process. A fan blows over the evaporator to cool an environmentally controlled space, e.g., a vehicle, tent, or structure. The fan can be coupled to the shaft and driven by the mechanical energy delivered to the shaft. Alternatively, the fan can be powered by an electrical motor with electricity provided by a battery, power grid, or electrical generator 404. In another embodiment, a chilled water system can be used where water is cooled rather than air in heat exchanger 394. Water flows through water cooling side 395 of heat exchanger 394. Working fluid 375 evaporates in heat exchanger 394 removing heat from the water in water cooling side 395. The chilled water exits the heat exchanger 394 and is stored in insulated storage or moved into a structure, where the chilled water is used to cool an area.

Working fluid 375 exits evaporator 394 and flows through three-way valve 386 into compressor 402. Compressor 402 is coupled to shaft 380. Shaft 380 drives compressor 402 to compress the gaseous working fluid 375 flowing from evaporator 394 and increases the pressure of working fluid 375. The speed of compressor 402 is controlled by the angular velocity of shaft 380. The speed of the shaft can be adjusted to drive the compressor at the desired rate. Pressurized working fluid 375 exiting compressor 402 mixes with working fluid 375 exiting expander 378 and passing through recuperator 382. The working fluid then passes to condenser 388.

Electrical machine 404 is coupled to shaft 380 either directly or through gearbox 406. Electrical machine 404 converts the kinetic energy in shaft 380 to electricity. Electrical machine 404 also acts as a motor to drive shaft 380 and compressor 402 when the heat from heaters 372 and 374 is insufficient to drive expander 378 and rotate shaft 380 at a sufficient rate.

Gearbox 406 is coupled to shaft 380 as well as one or more of expander 378, compressor 402, and electrical machine 404 to rotate the components at different speeds relative to one another. Clutch 408 is coupled to shaft 380 between expander and compressor to disengage the compressor from the expander. Clutch 408 can also be incorporated into gearbox 406. Clutch 409 can be coupled in different locations on shaft 380 to disengage any component coupled to the shaft and enable different modes of operation. Additional clutches can be added as needed to decouple components and enable different modes of operation. Clutch 409 can be an externally actuated or passive clutch. A passive, overrunning clutch can be used when electrical machine 404 is a motor to allow electrical machine 404 to drive compressor 402 independent of expander 378.

An electrical system is electrically connected to electrical machine 404. The electrical system includes a power converter 410 to convert power produced by electrical machine 404 configured as a generator to power suitable for use in local pumps or fans through electrical leads 412, for storage in battery 418, or use in another application. Relays 414 can be opened or closed to connect the system to the battery and or power grid. Bidirectional power converter 416 converts power generated by electrical machine 404 to a form suitable to send to the electrical grid or converts power from the electrical grid to a form suitable for use with the electrical system of the heating and cooling device. Power converter 410 can also convert power from battery 418 or an electrical grid to the proper form to drive electrical machine 404 configured as a motor. Electrical machine 404 can be an AC or DC electrical machine with the required voltage or type conversions carried out in converter 410. Electricity from electric machine 404 or battery 418 is used to power fans, pumps, and sensors used throughout the device.

The system in FIG. 4a can also be configured to operate in a cooling mode driven by battery power or electrical grid power by turning off power cycle 360 while heat pump cycle 362 operates with compressor 402 driven by electrical machine 404. Valve 376 is closed to prevent working fluid from flowing through expander 378. Pump 398 is turned off and is not needed to circulate working fluid in electrical powered cooling mode. Thermal heater 372 and gas heater 374 are both turned off as well. Electric machine 404 consumes electricity and drives shaft 380. Clutch 409 over runs to allow electrical machine 404 to rotate independent of expander 378. Clutch 408 is engaged to enable electrical machine 404 to turn compressor 402 and power the heat pump cycle. Working fluid 375 flows through valve 384, then heat exchanger 388, then valve 390, then valve 392, then heat exchanger 394, then through valve 386, and finally back to compressor 402. Heat exchanger 388, heat exchanger 394, and compressor 402 each operate in a manner similar to that described above.

Working fluid 375 flows through valve 384 into heat exchanger or condenser 388. Condenser 388 cools working fluid 375. While in the condenser, heat from working fluid 375 is transferred into a condenser coolant, e.g., air, water, or other fluid that is cooler than working fluid 375. In one embodiment, a fan blows over the condenser to reject heat from working fluid 375 to the atmosphere. The fan can be coupled to the shaft and driven by the mechanical energy delivered to the shaft, or the fan can be powered by an electrical motor with electricity provided by a battery, power grid, or electrical generator 404.

The condensed working fluid flows out of condenser 388 as a liquid and through bidirectional valve 390. Working fluid 375 then passes through bidirectional variable area expansion valve 392 to heat exchanger 394, exiting the expansion valve as a low-pressure, two-phase fluid. The working fluid then enters evaporator or heat exchanger 394.

Working fluid 375 in evaporator 394 evaporates from a liquid phase to a gas phase, absorbing heat in the process. A fan blows over the evaporator to cool an environmentally controlled space, e.g., a vehicle, tent, or structure. The fan can be coupled to the shaft and driven by the mechanical energy delivered to the shaft. Alternatively, the fan can be powered by an electrical motor with electricity provided by a battery, power grid, or electrical generator 404. In another embodiment, a chilled water system can be used where water is cooled rather than air in heat exchanger 394. Water flows through water cooling side 395 of heat exchanger 394. Working fluid 375 evaporates in heat exchanger 394 removing heat from the water in water cooling side 395. The chilled water exits the heat exchanger 394 and is stored in insulated storage or moved into a structure, where the chilled water is used to cool an area.

Working fluid 375 exits evaporator 394 and flows through three-way valve 386 into compressor 402. Compressor 402 is coupled to shaft 380. Shaft 380 drives compressor 402 to compress the gaseous working fluid 375 flowing from evaporator 394 and increases the pressure of working fluid 375. The speed of compressor 402 is controlled by the angular velocity of shaft 380. The speed of the shaft can be adjusted through gearing or by adjusting the rate of electrical machine 404 to drive the compressor at the desired rate. Pressurized working fluid 375 exiting compressor 402 passes through valve 384 to heat exchanger 388.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. The flexible system runs on thermal power, gas power, or electrical power depending on availability and cost of different energy sources.

The heating, cooling, and power device operates in multiple modes including solar-driven cooling and power, gas-driven cooling and power, stored-thermal energy driven cooling and power, storage battery or electric grid powered cooling, solar heating and power with or without a heat pump, stored thermal energy heating and power with or without a heat pump, gas fired heating and power with or without a heat pump, or storage battery or grid powered heating with a heat pump. Furthermore, the device can operate in combined modes, e.g., combined solar thermal powered and gas powered cooling, or combined solar thermal powered and electrically powered cooling. The multi-mode functionality of the device enables improved cost savings by selecting an operating mode based on the most cost effective energy available at a given time.

For example, if low-cost solar heat is available, the system can run on solar thermal power. If solar thermal power is available, but no energy is required to heat or cool a space, then the system sends electricity back to the electrical grid. If natural gas is a cheaper energy source than electricity, then the system can run on natural gas when solar thermal power is unavailable. During off-peak hours, if electricity is a lower cost energy source than gas, then the system can switch to electricity. The flexibility to operate on different power sources and return energy to the electrical grid in times of surplus enables the heating, cooling, and power device to operate with improved economic efficiency.

FIG. 4b illustrates the heating and cooling system of FIG. 4a, configured in heating mode by switching solenoid actuated valve 386. Solar collector 364 includes thermal solar panels to convert solar energy into thermal energy that is transferred into a heated fluid for transportation or storage. Valves 366 control the flow of the fluid, which flows from solar collector 364 to thermal storage 370. The thermal storage 370 stores heat for later use by storing heated fluid to be used as a heat source for heater 372. The heated fluid can also flow directly into heater 372 to provide heat to the heater 372 without stopping in thermal storage 370. Heater 372 transfers heat from the solar heat source into a working fluid flowing through heater 372 to increase the temperature of working fluid 375. Heater 372 is coupled through conduit 373 to gas heater 374. Conduit 373 can be tubing, pipe, or another medium configured to transport working fluid 375 through components of the heating, cooling, and power device.

Heated working fluid 375 exits heaters 372 or 374 as a high pressure superheated refrigerant and passes through expander startup and overspeed control valve 376, which limits the flow of working fluid 375 from heater 372 or 374 to expander 378. Expander 378 is a device that converts some of the thermal energy of working fluid 375 into kinetic energy to rotate shaft 380, e.g., a turbine, scroll expander, piston motor, or other expander. Working fluid 375 expands through expander 378 to drive shaft 380 coupled to the expander and exits the expander as a medium-pressure refrigerant. The rotational speed at which shaft 380 or expander 378 are rotating is monitored and sent to the controller 381 by sensors, to use the speed control logic to adjust the amount of energy delivered to shaft 380.

Working fluid 375 exits expander 378 and enters recuperator 382. Working fluid 375 entering recuperator 382 from expander 378 is at a higher temperature than working fluid 375 exiting recuperator 382 to enter heater 372 or 374, so the temperature of working fluid 375 exiting the recuperator towards the heater is increased in the recuperator. Heat from working fluid 375 exiting expander 378 is used to preheat working fluid 375 entering heater 372. Recuperator 382 increases efficiency by recapturing heat that would otherwise be lost as working fluid 375 exits expander 378. Working fluid 375 from expander 378 moves through recuperator 382 and enters solenoid actuated three-way valves 384 or 386, which are set to switch the heating and cooling system or heat pump into heating mode in FIG. 4b. For most efficient operation, working fluid 375 flows through valve 386 into heat exchanger or condenser 394. Valve 390 is closed unless more heat is available than is needed to heat the enclosed space. When excess heat is available, valve 390 is opened to reject excess heat from working fluid 375 through heat exchanger or condenser 388 into the condenser coolant or atmosphere.

Condenser 388 cools working fluid 375. While in the condenser, heat from working fluid 375 is transferred into a condenser coolant, e.g., air, water, or other fluid that is cooler than working fluid 375. The heat removed from working fluid 375 can either be rejected to the atmosphere or used to heat an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or electrical generator 404.

The condensed working fluid flows out of condenser 388 as a liquid and through bidirectional valve 390 towards reservoir or feed tank 396. Working fluid 375 from recuperator 382 that travels through valve 386 enters heat exchanger 394. Heat exchanger 394 operates as a condenser rather than an evaporator when the system is configured in heating mode. Heat exchanger 394 cools working fluid 375 in heating mode. While in the heat exchanger 394, heat from working fluid 375 is transferred into a condenser coolant, e.g., air, water, or other fluid that is cooler than working fluid 375. The condensed working fluid flows out of heat exchanger 394 towards reservoir or feed tank 396 as a liquid.

Working fluid 375 that passes through valve 390 returns to reservoir or feed tank 396. Reservoir 396 includes a fluid level sensor to detect the amount of working fluid 375 available in reservoir 396. A conduit extends between variable speed pump 398 and reservoir 396 so that pump 398 can pressurize working fluid 375 to a high pressure liquid. Speed sensor 400 monitors pump 398 and transmits data to controller 381 to adjust the pressure of pump 398 as needed. Pressurized working fluid 375 exits pump 398 and flows through recuperator 382 for preheating. Working fluid 375 then exits recuperator 382 after preheating and enters heater 372 or 374.

Compressor 402 is coupled to shaft 380, but is not required in all heating modes. For example, compressor 402 is not required when operating the system without a heat pump function. Shaft 380 can be disengaged from compressor 402 using clutch 408. Clutch 408 is coupled to shaft 380 between expander and compressor to disengage the compressor from the expander. Clutch 409 can be coupled in different locations on shaft 380 to disengage any component coupled to the shaft and enable different modes of operation. Clutches 408 and 409 can be an externally actuated or passive clutches.

Electrical machine 404 is coupled to shaft 380 either directly or through gearbox 406. Electrical machine 404 converts the kinetic energy in shaft 380 to electricity. Electrical machine 404 also acts as a motor to drive shaft 380 and compressor 402 when the heat from heaters 372 and 374 is insufficient to drive expander 378 and rotate shaft 380 at a sufficient rate.

Gearbox 406 is coupled to shaft 380 as well as one or more of expander 378, compressor 402, and electrical machine 404 to rotate the components at different speeds relative to one another. Clutch 408 is coupled to shaft 380 between expander and compressor to disengage the compressor from the expander. Clutch 408 can also be incorporated into gearbox 406. Clutch 408 can be coupled in different locations on shaft 380 to disengage any component coupled to the shaft and enable different modes of operation. Clutch 408 can be an externally actuated or passive clutches. A passive, overrunning clutch can be used when electrical machine 404 is configured as a motor to allow electrical machine 404 to drive compressor 402 independent of expander 378.

An electrical system is electrically connected to electrical machine 404. The electrical system includes a power converter 410 to convert power produced by electrical machine 404 configured as a generator to power suitable for use in local pumps or fans through electrical leads 412, for storage in battery 418, or use in another application. Relays 414 can be opened or closed to connect the system to the battery and or power grid. Bidirectional power converter 416 converts power generated by electrical machine 404 to a form suitable to send to the electrical grid or converts power from the electrical grid to a form suitable for use with the electrical system of the heating and cooling device. Power converter 410 can also convert power from battery 418 or an electrical grid to the proper form to drive electrical machine 404 configured as a motor. Electrical machine 404 can be an AC or DC electrical machine with the required voltage or type conversions carried out in converter 410. Electricity from electric machine 404 or battery 418 is used to power fans, pumps, and sensors used throughout the device.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. The flexible system runs on thermal power, gas power, or electrical power depending on availability and cost of different energy sources.

The heating, cooling, and power device operates in multiple modes including solar-driven cooling and power, gas-driven cooling and power, stored-thermal energy driven cooling and power, storage battery or electric grid powered cooling, solar heating and power with or without a heat pump, stored thermal energy heating and power with or without a heat pump, gas fired heating and power with or without a heat pump, or storage battery or grid powered heating with a heat pump. Furthermore, the device can operate in combined modes, e.g., combined solar thermal powered and gas powered cooling, or combined solar thermal powered and electrically powered cooling. The multi-mode functionality of the device enables improved cost savings by selecting an operating mode based on the most cost effective energy available at a given time.

For example, if low-cost solar heat is available, the system can run on solar thermal power. If solar thermal power is available, but no energy is required to heat or cool a space, then the system sends electricity back to the electrical grid. If natural gas is a cheaper energy source than electricity, then the system can run on natural gas when solar thermal power is unavailable. During off-peak hours, if electricity is a lower cost energy source than gas, then the system can switch to electricity. The flexibility to operate on different power sources and return energy to the electrical grid in times of surplus enables the heating, cooling, and power device to operate with improved economic efficiency.

In FIG. 4c, the device is configured in a heating mode. The device includes power cycle 360 and heat pump cycle 362. Solar collector 364 includes thermal solar panels to convert solar energy into thermal energy. The thermal energy is transferred into a heated fluid such as specialized thermal oil for transportation or storage, although other fluids are also effective, e.g., water or any fluid suitable for transporting and storing heat. Valves 366 control the flow of the fluid, which is moved by pump 368 from solar collector 364 to thermal storage 370. Pump 368 can be placed at various points on the thermal heating system.

Thermal storage 370 stores heat for later use by storing heated fluid in an insulated container. The stored liquid is later used as a heat source for heater 372. Heat storage allows for time shifting the operation of the heating, cooling, and power device for operation on solar heat energy. Solar heat energy can be used when solar energy is usually unavailable, i.e., at night. Storage can also preserve excess solar energy for later use. The heated fluid can also flow directly into heater 372 without stopping in thermal storage 370 to provide heat to the heater 372. Heater 372 is coupled through conduit 373 to a supplemental heater, such as gas heater 374. Conduit 373 can be tubing, pipe, or another medium configured to transport working fluid 375 through components of the heating, cooling, and power device.

Heater 372 transfers heat from the solar heat source into a working fluid, i.e., a refrigerant, water, or other suitable liquid, flowing through heater 372 to increase the temperature of working fluid 375. Gas heater 374 is used in addition, or as an alternative, to solar collector 364 as a heat source to heat working fluid 375. The heated working fluid exits heaters 372 or 374 as a high-pressure, superheated refrigerant and passes through expander startup and overspeed control valve 376, which limits the flow of working fluid 375 from heater 372 or 374 to expander 378. Alternatively, working fluid exiting the heaters can flow through orifice 377 and bypass valve 379 to bypass expander 378.

Expander 378 is a device that converts some of the thermal energy of working fluid 375 into kinetic energy to rotate shaft 380, e.g., a turbine, scroll expander, piston motor, or other expander. Working fluid 375 expands through expander 378 to drive shaft 380, which is coupled to the expander. Working fluid 375 then exits the expander as a medium-pressure refrigerant. The rotational speed at which shaft 380 or expander 378 are rotating is monitored and sent to the controller 381 by sensors, to use the speed control logic to adjust the amount of energy delivered to shaft 380.

Working fluid 375 exits expander 378 and enters recuperator 382. Heat from working fluid 375 exiting expander 378 is used to preheat working fluid 375 entering heater 372. Working fluid 375 entering recuperator 382 from expander 378 has a higher temperature than working fluid 375 exiting recuperator 382 to enter heater 372 or 374, so the temperature of working fluid 375 exiting the recuperator towards the heater is increased in the recuperator. Recuperator 382 increases efficiency by recapturing thermal energy that would otherwise be rejected to the atmosphere by condenser 388. Working fluid 375 from expander 378 moves through recuperator 382 and enters three-way valve 386. Valve 384 and valve 386 are configured to switch the heating and cooling system or heat pump into heating mode with a compressor in FIG. 4c. Three-way valves 384 and 386 can be replaced with different valve configurations similar to the valves shown in FIGS. 1-3b. Working fluid 375 flows through valve 386.

Working fluid 375 from recuperator 382 that travels through valve 386 enters heat exchanger 394. Heat exchanger 394 operates as a condenser rather than an evaporator when the system is configured in heating mode. Heat exchanger 394 cools working fluid 375 in heating mode. While in the heat exchanger 394, heat from working fluid 375 is transferred into a condenser coolant, e.g., air, water, or other fluid that is cooler than working fluid 375. In one embodiment, a fan blows over heat exchanger 394 to heat an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or electrical generator 404.

The condensed working fluid flows out of heat exchanger 394 either towards reservoir 396 or towards heat exchanger 388. Working fluid 375 flows through valve 392, through bidirectional valve 390 operating as an expansion valve, and into heat exchanger or evaporator 388. Working fluid 375 in evaporator 388 evaporates from a liquid phase to a gas phase, absorbing heat in the process. A fan blows over the evaporator to move a fluid over the evaporator. Typical heat pump operation uses outside ambient air as the heat source to vaporize working fluid 375, but other sources of heat could be used, e.g., ground heat or water heat from the surrounding environment. The fan can be coupled to the shaft and driven by the mechanical energy delivered to the shaft. Alternatively, the fan can be powered by an electrical motor with electricity provided by a battery, power grid, or electrical generator 404. Working fluid 375 exits heat exchanger 388 and flows through valve 384 to compressor 402.

Compressor 402 is coupled to shaft 380. Shaft 380 drives compressor 402 to compress the gaseous working fluid 375 flowing from heat exchanger 388 and increases the pressure of working fluid 375. The speed of compressor 402 is controlled by the angular velocity of shaft 380. The speed of the shaft can be adjusted to drive the compressor at the desired rate. Pressurized working fluid 375 exiting compressor 402 mixes with working fluid 375 exiting expander 378 and passing through recuperator 382. The working fluid then passes through valve 386 to heat exchanger 394.

Electrical machine 404 is coupled to shaft 380 either directly or through gearbox 406. Electrical machine 404 converts the kinetic energy in shaft 380 to electricity. Electrical machine 404 also acts as a motor to drive shaft 380 and compressor 402 when the heat from heaters 372 and 374 is insufficient to drive expander 378 and rotate shaft 380 at a sufficient rate.

Gearbox 406 is coupled to shaft 380 as well as one or more of expander 378, compressor 402, and electrical machine 404 to rotate the components at different speeds relative to one another. Clutch 408 is coupled to shaft 380 between expander and compressor to disengage the compressor from the expander. Clutch 408 can also be incorporated into gearbox 406. Clutch 409 can be coupled in different locations on shaft 380 to disengage any component coupled to the shaft and enable different modes of operation. Additional clutches can be added as needed to decouple components and enable different modes of operation. Clutch 409 can be an externally actuated or passive clutch. A passive, overrunning clutch can be used when electrical machine 404 is a motor to allow electrical machine 404 to drive compressor 402 independent of expander 378.

An electrical system is electrically connected to electrical machine 404. The electrical system includes a power converter 410 to convert power produced by electrical machine 404 configured as a generator to power suitable for use in local pumps or fans through electrical leads 412, for storage in battery 418, or use in another application. Relays 414 can be opened or closed to connect the system to the battery and or power grid. Bidirectional power converter 416 converts power generated by electrical machine 404 to a form suitable to send to the electrical grid or converts power from the electrical grid to a form suitable for use with the electrical system of the heating and cooling device. Power converter 410 can also convert power from battery 418 or an electrical grid to the proper form to drive electrical machine 404 configured as a motor. Electrical machine 404 can be an AC or DC electrical machine with the required voltage or type conversions carried out in converter 410. Electricity from electric machine 404 or battery 418 is used to power fans, pumps, and sensors used throughout the device.

The system in FIG. 4c can also be configured to operate in a heating mode driven by battery power or electrical grid power by turning off power cycle 360 while heat pump cycle 362 continues aided by compressor 402. Valve 376 is closed to prevent working fluid from flowing through expander 378. Pump 398 is turned off and is not needed to circulate working fluid in electrical powered heating mode. Thermal heater 372 and gas heater 374 are both turned off as well. Electric machine 404 consumes electricity and drives shaft 380. Clutch 409 over runs to allow electrical machine 404 to rotate independent of expander 378. Clutch 408 is engaged to enable electrical machine 404 to turn compressor 402 and power the heat pump cycle. Working fluid 375 travels through valve 386 enters heat exchanger 394. Heat exchanger 394 operates as a condenser rather than an evaporator when the system is configured in heating mode. Heat exchanger 394 cools working fluid 375 in heating mode. While in the heat exchanger 394, heat from working fluid 375 is transferred into a condenser coolant, e.g., air, water, or other fluid that is cooler than working fluid 375. In one embodiment, a fan blows over heat exchanger 394 to heat an environmentally controlled space, e.g., a vehicle, tent, or structure. The fan can be coupled to the shaft and driven by the mechanical energy delivered to the shaft, or the fan can be powered by an electrical motor with electricity provided by a battery, power grid, or electrical generator 404.

The condensed working fluid flows out of heat exchanger 394 towards heat exchanger 388. Working fluid 375 flows through valve 392, through bidirectional valve 390 operating as an expansion valve, and into heat exchanger 388 operating as an evaporator. Working fluid 375 in evaporator 388 evaporates from a liquid phase to a gas phase, absorbing heat in the process. A fan blows over the evaporator to move a fluid over the evaporator. The fan can be coupled to the shaft and driven by the mechanical energy delivered to the shaft. Alternatively, the fan can be powered by an electrical motor with electricity provided by a battery, power grid, or electrical generator 404. Working fluid 375 exits heat exchanger 388 and flows through valve 384 to compressor 402.

Compressor 402 is coupled to shaft 380. Shaft 380 drives compressor 402 to compress the gaseous working fluid 375 flowing from heat exchanger 388 and increases the pressure of working fluid 375. The speed of compressor 402 is controlled by the angular velocity of shaft 380. The speed of the shaft can be adjusted to drive the compressor at the desired rate by adjusting the speed of electrical machine 404. Pressurized working fluid 375 exiting compressor 402 passes through valve 386 to heat exchanger 394.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. The flexible system runs on thermal power, gas power, or electrical power depending on availability and cost of different energy sources.

The heating, cooling, and power device operates in multiple modes including solar-driven cooling and power, gas-driven cooling and power, stored-thermal energy driven cooling and power, storage battery or electric grid powered cooling, solar heating and power with or without a heat pump, stored thermal energy heating and power with or without a heat pump, gas fired heating and power with or without a heat pump, or storage battery or grid powered heating with a heat pump. Furthermore, the device can operate in combined modes, e.g., combined solar thermal powered and gas powered cooling, or combined solar thermal powered and electrically powered cooling. The multi-mode functionality of the device enables improved cost savings by selecting an operating mode based on the most cost effective energy available at a given time.

For example, if low-cost solar heat is available, the system can run on solar thermal power. If solar thermal power is available, but no energy is required to heat or cool a space, then the system sends electricity back to the electrical grid. If natural gas is a cheaper energy source than electricity, then the system can run on natural gas when solar thermal power is unavailable. During off-peak hours, if electricity is a lower cost energy source than gas, then the system can switch to electricity. The flexibility to operate on different power sources and return energy to the electrical grid in times of surplus enables the heating, cooling, and power device to operate with improved economic efficiency.

Figure 5A:
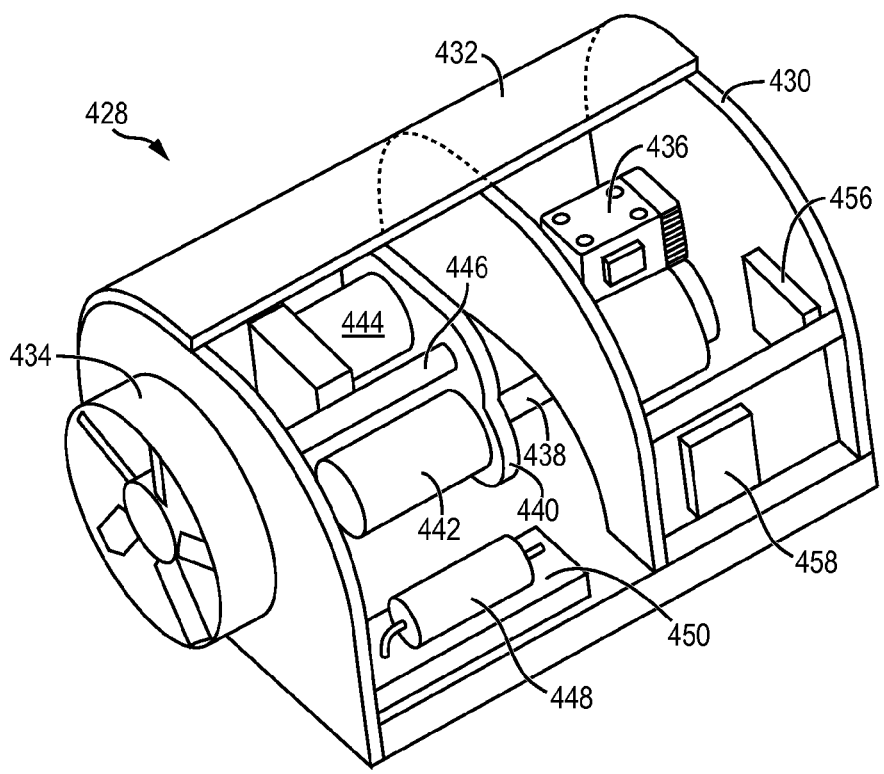
FIGS. 5*a*-5*b* illustrate a heating, cooling, and power device including a prime mover and configured for cooling or heating a conditioned space.
Figure 5B:
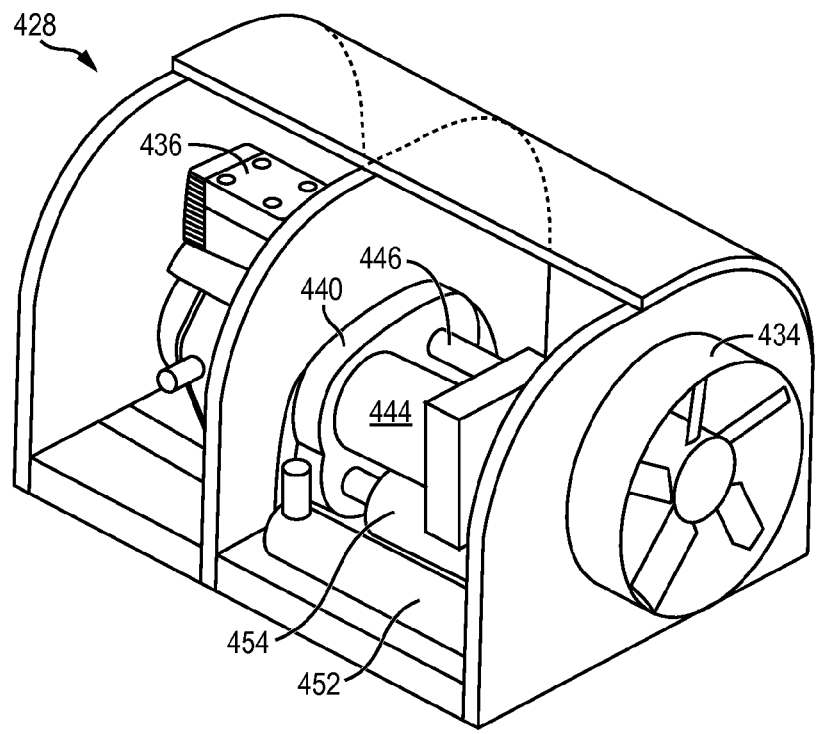

FIGS. 5a-5b illustrate a heating, cooling, and power device 428 similar to the device shown in FIG. 2. In FIG. 5a, heating, cooling, and power device 428 is assembled in housing 430. Housing 430 includes condenser or heat exchanger 432 forming the upper surface of housing 430. Fan 434 is located at a distal end of housing 430 to circulate air through housing 430 and over condenser or heat exchanger 432. Condenser 432 is cutaway to show components of the heating, cooling, and power device assembled within housing 430. Housing 430 includes an engine compartment at an end of the housing opposite fan 434. Fuel-powered prime mover or engine 436 is disposed within the engine compartment. Prime mover 436 rotates shaft 438 to provide power into gearbox 440.

Electrical machine 442 is also coupled to gearbox 440. Electrical machine 442 can be configured as a generator to convert kinetic energy from gearbox 440 into electricity. Alternatively, electrical machine 442 can be configured as an electric motor to provide kinetic energy into gearbox 440.

Expander 444 is also coupled to gearbox 440. Expander 444 converts thermal energy into mechanical energy that powers gearbox 440. A heated working fluid flows through expander 444 to convert heat from the working fluid into mechanical energy. Mechanical energy produced from expander 444 is directed into the system through gearbox 440. Mechanical energy from expander 444 is converted into electricity when electrical machine 442 is configured as a generator. Shaft 446 rotates fan 434 using power from gearbox 440.

The working fluid is pressurized and pumped through the system by liquid pump 448. Working fluid leaves liquid pump 448 and flows into recuperator 450. The working fluid flowing into recuperator 450 from liquid pump 448 is cooler than working fluid exiting expander 444 and entering recuperator 450. Heat from the working fluid exiting the expander is transferred into the working fluid flowing from the liquid pump through the recuperator. The working fluid is preheated to increase the efficiency of the system by transferring heat energy from the working fluid exiting the expander. The preheated working fluid then flows into heater 452, shown in FIG. 5b.

Prime mover 436 produces an exhaust made of hot gases as a result of combustion. The exhaust flows from prime mover 436 through an exhaust pipe to heater 452. The exhaust from prime mover 436 serves as a heat source for heater 452. Working fluid inside heater 452 absorbs heat energy from the exhaust of prime mover 436. The working fluid leaves heater 452 as a superheated refrigerant. The superheated refrigerant enters expander 444, which converts some of the thermal energy in the superheated working fluid into mechanical energy. The working fluid leaving expander 444 flows through recuperator 450 and through heat exchanger 432. Heat exchanger 432 operates as a condenser to remove energy from the working fluid and transfer the energy into a condenser fluid, e.g., the air blown through the system by fan 434.

Working fluid flows out of condenser 432 and through an evaporator to provide cooling to an area. After flowing through the evaporator, the working fluid flows into compressor 454. Compressor 454 is coupled to gearbox 440. Gearbox 440 drives compressor 454 to compress the gaseous working fluid from evaporator 126 and increase the pressure of the working fluid. The speed of compressor 454 is controlled by the angular velocity of gearbox 440 so that the speed of the shaft can be adjusted to drive the compressor at the desired rate. The pressurized working fluid exiting compressor 454 mixes with the working fluid exiting expander 106 and passes through recuperator 164.

Gearbox 440 includes one or more clutches to disengage compressor 454 or other components from gearbox 440 depending on the desired mode of operation. The clutch in gearbox 440 can be an externally actuated or passive clutch. A passive, overrunning clutch can be used when electrical machine 442 is configured as a motor to allow electrical machine 442 to drive compressor 454 independent of expander 444.

Controller 458 and system inverter 456 are also adjacent to the engine compartment and exposed from the engine compartment cover to allow control of the system. System control includes a visual output and user inputs to enable a user to configure the heating, cooling, and power device. The device can be configured to produce heating, cooling, or neither, depending on the desired temperature in a conditioned space. Additionally, the device can be configured to consume electricity or produce electricity by switching electric machine into a motor mode or a generator mode, respectively. The device can further be configured to run on mechanical energy provided by any combination of electrical motor 442, fuel powered prime mover 436, and expander 444.

The heating, cooling, and power device maximizes efficiency by using a common working fluid for the power cycle and heat pump cycle. A common working fluid flows through the heater, expander, and heat pump to provide power to a shaft while heating or cooling a space. By functioning with a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. A prime mover is coupled to the shaft to enhance cost efficiency and enable the system to run on fuel power, thermal power, or electrical power depending on availability and cost of different energy sources. By using the exhaust from the prime mover as a heat source, some of the thermal energy normally expelled in hot exhaust is recovered and used to produce mechanical or electrical power.

Figure 6:
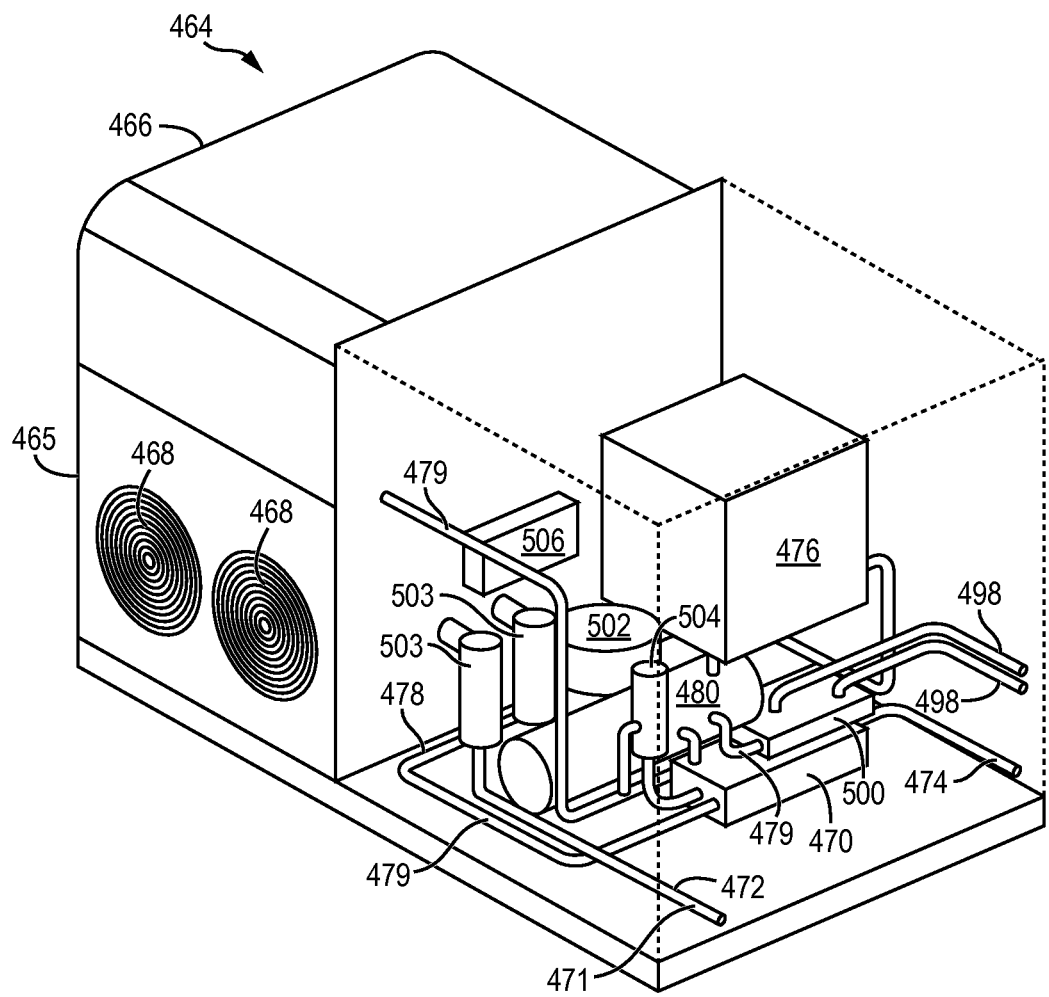
FIG. 6 illustrates a heating, cooling, and power device configured for cooling a conditioned space and including an electrical machine.

FIG. 6 is a perspective view of a heating, cooling, and power system similar to that shown in FIGS. 4a-4c. Heating, cooling, and power device 464 includes housing 465 to enclose and environmentally protect internal components of device 464. A condenser coil 466 is integrated into housing 465 with condenser fans 468 blowing air through condenser coil 466 to remove heat from condenser coils 466. Multiple condenser fans are placed on each side of housing 465 to increase air flow over condenser coil 466 in housing 465. In one embodiment, 6 condenser fans 468 are placed on three adjacent sides of housing 465 to move air over condenser coils 466.

Figure 7:
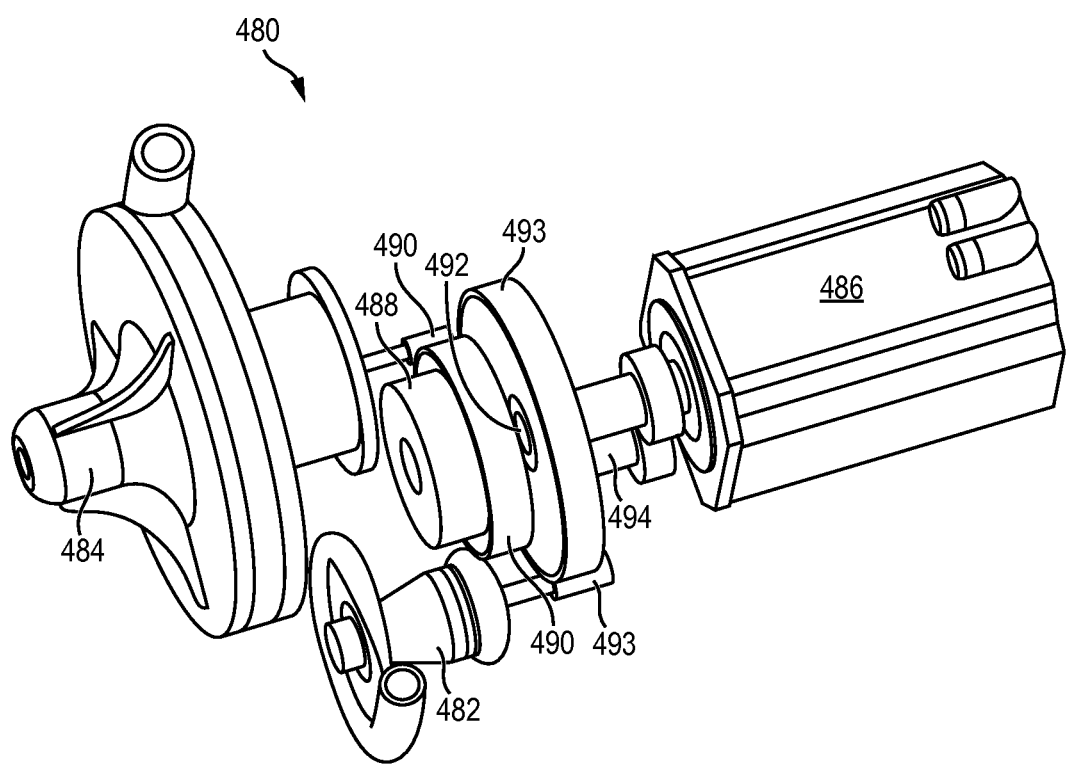
FIG. 7 illustrates a rotating group for use in a heating, cooling, and power device including an electrical machine, a condenser, and an expander.

Device 464 includes enclosure 470 containing a solar heater and a recuperator. The solar collectors are thermally linked to the solar heater by a heated thermal fluid 471 flowing through outlet port 472 and inlet port 474. A thermal solar panel array transfers solar energy into thermal fluid 471 to increase the temperature of the fluid. Heated thermal fluid 471 flows into port 474 and into heater in enclosure 470. The heater transfers thermal energy from thermal fluid 471 to working fluid 479, increasing the temperature of working fluid 479. The working fluid then passes to gas heater 476 through conduit 478. Gas heater 476 further heats the working fluid. Heated working fluid 479 exits the gas heater and flows into an expander in rotating group 480, depicted in further detail in FIG. 7.

Rotating group 480 includes an expander 482, compressor 484, and electrical machine 486 that can act as a motor or generator. Compressor 484 is coupled to electrical machine 486 through electric clutch 488 and drive gears 490. Expander 482 is coupled to electrical machine 486 through one-way clutch 492 and gears 493. Expander 482, compressor 484, and electrical motor or generator 486 can all be rotating simultaneously at different speeds due to drive gears. Alternatively, electrical clutch 488 can be used to disengage compressor 484 to allow the heating, cooling, and power device to operate without a heat pump. When expander shutdown valve 376 is closed, one-way clutch disengages expander 378 allowing electrical machine 486 to power compressor 484 independent of expander 482. A lubricant module 494 prevents wear on rotating group 480 by keeping rotating group 480 lubricated.

Returning to FIG. 6, the expander converts thermal energy into mechanical energy to power a compressor and electrical machine 486 within rotating group 480. Heated working fluid 479 flows through the expander to convert heat from working fluid 479 into mechanical energy. Mechanical energy produced by the expander is used to power a compressor 484 within rotating group 480. Mechanical energy produced by the expander but not used to power the compressor is converted into electricity by the electrical machine 486 in rotating group 480. Alternatively, the electrical machine can be configured as an electrical motor to power the compressor when the expander is not producing sufficient power.

Working fluid 479 leaves expander 482 and enters recuperator in enclosure 470 to recover heat from the working fluid and increase efficiency. Working fluid 479 then exits the recuperator housed in enclosure 470 and flows through condenser coils in housing 465. Working fluid 479 is condensed from a gas into a liquid phase and heats the air blown over the condenser coils. In a chilled water system, water flows through inlet and outlet pipes 498 into and out of heat exchanger 500. Working fluid 479 evaporates in heat exchanger 500 removing heat from the water. The chilled water exits the heat exchanger and is stored in insulated storage or moved into a structure, where the chilled water is used to cool an area.

Working fluid 479 leaves heat exchanger 500 and enters the compressor 484 in rotating group 480. The compressor pressurizes working fluid 479 using mechanical energy from either electrical machine 486 or an expander 482 in rotating group 480. Thermal oil expansion tank 502 stores thermal fluid 471 and circulation pumps 503 pump thermal fluid 471 to deliver heat from the solar collectors to device 464.

Liquid pump 504 pressurizes working fluid 479 before entering the recuperator housed in enclosure 470.

Enclosure 506 contains a system controller and power inverters required for electrical machine 486 operating as a motor or generator. The system controller controls the flow of working fluid 479 through device 464. The device can be configured to produce heating, cooling, or neither, depending on the desired temperature in a conditioned space. Additionally, the device can be configured to consume electricity or produce electricity by switching electric machine 486 into a motor mode or a generator mode, respectively. Device 464 can further be configured to run on mechanical energy provided by any combination of the electrical machine 486 or the expander 482 in rotating group 480.

The heating, cooling, and power device operates in multiple modes including solar-driven cooling and power, gas-driven cooling and power, stored thermal energy driven cooling and power, storage battery or electric grid powered cooling, solar heating and power with or without a heat pump, stored thermal energy heating and power with or without a heat pump, gas fired heating and power with or without a heat pump, and storage battery or grid powered heating with a heat pump. Furthermore, the device can operate in combined modes, e.g., combined solar thermal powered and gas powered cooling, or combined solar thermal powered and electrically powered cooling. The multimode functionality of device 464 enables improved cost savings by selecting an operating mode based on the most cost effective energy available at a given time.

The heating, cooling, and power device maximizes efficiency by using a common working fluid for the power cycle and heat pump cycle. A common working fluid flows through the heater, expander, and heat pump to provide power to a shaft while heating or cooling a space. By using a common working fluid, the heating, cooling, and power system operates without requiring energy conversions from heat to electricity, thereby conserving energy normally lost in conversion. An electrical machine is coupled to the shaft to augment power provided by the expander or to convert excess power provided by the expander into electricity. The flexible system runs on thermal power, gas power, or electrical power depending on availability and cost of different energy sources.

For example, if low-cost solar heat is available, the system can run on solar thermal power. If solar thermal power is available, but no energy is required to heat or cool a space, then the system sends electricity back to the electrical grid. If natural gas is a cheaper energy source than electricity, then the system can run on natural gas when solar thermal power is unavailable. During off-peak hours, if electricity is a lower cost energy source than gas, then the system can switch to electricity. The flexibility to operate on different power sources and return energy to the electrical grid in times of surplus enables the heating, cooling, and power device to operate with improved economic efficiency.

While one or more embodiments of the present invention have been illustrated in detail, the skilled artisan will appreciate that modifications and adaptations to those embodiments may be made without departing from the scope of the present invention as set forth in the following claims.

What is claimed is:

1. A heating, cooling, and power device, comprising:
    a solar thermal collector configured to provide thermal energy input directly to a first working fluid;
    a thermal storage unit coupled to receive the first working fluid from the solar thermal collector;
    a heater coupled to receive the first working fluid from the thermal storage unit and transfer thermal energy from the first working fluid to a second working fluid;
    a first pump coupled to move the first working fluid from the solar thermal collector and the thermal storage unit to the heater;
    a first valve coupled between the first pump and the solar thermal collector to control flow of the first working fluid;
    a second valve coupled between the first pump and the thermal storage unit to control flow of the first working fluid;
    a gas heater coupled to receive the second working fluid from the heater;
    an expander coupled to receive the second working fluid from the gas heater;
    a bypass valve coupled between an inlet port of the expander and an outlet port of the expander to selectively route the second working fluid around the expander;
    a shaft configured to be rotated by the expander, wherein the expander converts thermal energy in the second working fluid to kinetic energy of the shaft;
    a heat pump including,
        a compressor coupled to the shaft, and
        a third valve configured to switch the heat pump between a cooling mode and a heating mode;
    an electric machine coupled to the shaft;
    a first clutch mechanically coupled to the shaft between the expander and electric machine; and
    a second clutch mechanically coupled to the shaft between the electric machine and compressor, wherein the first clutch and second clutch are both engaged so that the expander powers the electric machine and heat pump by rotating the shaft.

2. The heating, cooling, and power device of claim 1, further including a recuperator coupled to receive the second working fluid from the expander.

3. The heating, cooling, and power device of claim 1, wherein the heat pump includes:
    a first heat exchanger including a second conduit coupled between the expander and the first heat exchanger;
    an expansion device including a third conduit coupled between the first heat exchanger and the expansion device; and
    a second heat exchanger including a fourth conduit coupled between the expansion device and second heat exchanger.

4. The heating, cooling, and power device of claim 1, further including a battery electrically connected to the electric machine.

5. A heating, cooling, and power device, comprising:
    a solar thermal collector;
    a heater coupled to receive a first working fluid from the solar thermal collector and transfer thermal energy from the first working fluid to a second working fluid;
    a thermal storage unit coupled between the solar thermal collector and heater, wherein the first working fluid flows in a circuit through the solar thermal collector, thermal storage unit, and heater;
    a gas heater coupled to receive the second working fluid from the heater;
    an expander coupled to receive the second working fluid from the gas heater;
    a bypass valve coupled in parallel with the expander to selectively route the second working fluid around the expander;

a shaft coupled to the expander;
a heat pump including,
   a compressor coupled to the shaft, and
   a mode valve coupled to switch the heat pump between a cooling mode and a heating mode;
an electrical machine coupled to the shaft; and
a clutch mechanically coupled to the shaft between the expander and electrical machine.

6. The heating, cooling, and power device of claim 5, wherein the heat pump includes:
   a first heat exchanger comprising a second conduit coupled between the expander and the first heat exchanger;
   an expansion device comprising a third conduit coupled between the first heat exchanger and the expansion device; and
   a second heat exchanger comprising a fourth conduit coupled between the expansion device and second heat exchanger.

7. The heating, cooling, and power device of claim 5, wherein the electrical machine is configured to generate electricity from rotation of the shaft.

8. A method of making a heating, cooling, and power device, comprising:
   providing a solar thermal collector to transfer solar energy to thermal energy in a first working fluid;
   coupling a first heater to receive the first working fluid from the solar thermal collector and transfer the thermal energy from the first working fluid to a second working fluid;
   providing a second heater to receive the first working fluid from the first heater and provide additional thermal energy to the second working fluid;
   coupling an expander to receive the second working fluid from the first heater and second heater;
   coupling an electrical machine to the expander;
   mechanically coupling a heat pump to the expander and electrical machine through a shaft;
   mechanically coupling a clutch to the shaft between the expander and electrical machine; and
   engaging the clutch to transfer mechanical energy from the expander to the heat pump, wherein the second working fluid includes thermal energy from the first heater and second heater that powers the expander.

9. The method of claim 8, wherein providing the heat pump includes:
   providing a first heat exchanger comprising a first conduit coupled between the expander and the first heat exchanger, the first conduit configured for transporting the second working fluid;
   providing an expansion device comprising a second conduit coupled between the first heat exchanger and the expansion device, the second conduit configured for transporting the second working fluid; and
   providing a second heat exchanger comprising a third conduit coupled between the expansion device and second heat exchanger, the third conduit configured for transporting the second working fluid.

10. The method of claim 8, wherein providing the heat pump includes providing a valve to switch a mode of the heat pump.

11. The method of claim 8, wherein providing the heat pump includes coupling a compressor to the expander using a shaft.

12. The heating, cooling, and power device of claim 1, further including a gearbox coupled to the shaft.

13. The heating, cooling, and power device of claim 3, further including a fan positioned to blow air on the second heat exchanger and configured to be powered by rotation of the shaft.

14. A method of heating, cooling, and providing power, comprising:
   providing a solar thermal collector configured to provide thermal energy input directly to a first working fluid;
   transferring the first working fluid from the solar thermal collector to a thermal storage unit;
   transferring the first working fluid from the thermal storage unit to a heater, wherein the heater transfers thermal energy from the first working fluid to a second working fluid;
   providing a first pump to transfer the first working fluid from the solar thermal collector and the thermal storage unit to the heater and back to the solar thermal collector or thermal storage unit;
   providing a first valve between the first pump and the solar thermal collector to control flow of the first working fluid;
   providing a second valve between the first pump and the thermal storage unit to control flow of the first working fluid;
   transferring the second working fluid from the heater to a gas heater;
   increasing a thermal energy of the second working fluid using the gas heater;
   transferring the second working fluid from the gas heater to an expander;
   providing a bypass valve between an inlet port of the expander and an outlet port of the expander to selectively route the second working fluid around the expander;
   rotating a shaft using the expander, wherein the expander converts thermal energy in the second working fluid to kinetic energy of the shaft;
   providing a heat pump including,
     a compressor coupled to the shaft, and
     a valve coupled to switch the heat pump between a cooling mode and a heating mode;
   providing an electric machine coupled to the shaft and configured to generate electricity from rotation of the shaft;
   providing a first clutch mechanically coupled to the shaft between the expander and electric machine;
   providing a second clutch mechanically coupled to the shaft between the electric machine and compressor; and
   engaging the first clutch and second clutch simultaneously so that the expander powers the electric machine and heat pump simultaneously by rotating the shaft.

15. The method of claim 14, further including providing a recuperator coupled to receive the second working fluid from the expander.

16. The method of claim 14, wherein providing the heat pump includes:
   providing a first heat exchanger including a second conduit coupled between the expander and the first heat exchanger;
   providing an expansion device including a third conduit coupled between the first heat exchanger and the expansion device; and
   providing a second heat exchanger including a fourth conduit coupled between the expansion device and second heat exchanger.

17. The method of claim 16, further blowing air on the second heat exchanger using a fan, wherein the fan is powered by electricity generated by the electrical machine.

18. The method of claim 14, further including providing a battery electrically connected to the electric machine to store electrical energy generated by the electric machine and drive the electrical machine using electrical energy stored in the battery.

19. The method of claim 14, further including providing a gearbox coupled to the shaft between the electrical machine and compressor.

\* \* \* \* \*

UNITED STATES PATENT AND TRADEMARK OFFICE
CERTIFICATE OF CORRECTION

PATENT NO. : 9,927,157 B2  
APPLICATION NO. : 14/089107  
DATED : March 27, 2018  
INVENTOR(S) : Dwayne M. Benson Page 1 of 1

It is certified that error appears in the above-identified patent and that said Letters Patent is hereby corrected as shown below:

In the Claims

Column 27, Line 32 please replace "first working fluid" with --second working fluid--.

Column 27, Line 65 please replace "a shaft" with --the shaft--.

Signed and Sealed this
Thirteenth Day of November, 2018

Andrei Iancu
*Director of the United States Patent and Trademark Office*